US010873093B2

(12) United States Patent
Nonoyama et al.

(10) Patent No.: US 10,873,093 B2
(45) Date of Patent: Dec. 22, 2020

(54) FUEL CELL AND FUEL CELL STACK

(71) Applicant: TOYOTA JIDOSHA KABUSHIKI KAISHA, Toyota (JP)

(72) Inventors: Nobuaki Nonoyama, Chiryu (JP); Seiji Mizuno, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 73 days.

(21) Appl. No.: 16/430,796

(22) Filed: Jun. 4, 2019

(65) Prior Publication Data
US 2019/0379066 A1 Dec. 12, 2019

(30) Foreign Application Priority Data
Jun. 12, 2018 (JP) .................. 2018-111845

(51) Int. Cl.
*H01M 8/0258* (2016.01)
*H01M 8/2483* (2016.01)
*H01M 8/0273* (2016.01)
*H01M 8/04291* (2016.01)
*H01M 8/1004* (2016.01)

(52) U.S. Cl.
CPC ....... *H01M 8/0258* (2013.01); *H01M 8/0273* (2013.01); *H01M 8/04291* (2013.01); *H01M 8/1004* (2013.01); *H01M 8/2483* (2016.02)

(58) Field of Classification Search
None
See application file for complete search history.

(56) References Cited

U.S. PATENT DOCUMENTS

| | | | |
|---|---|---|---|
| 10,790,532 B2* | 9/2020 | Kanno | H01M 8/2483 |
| 2004/0265672 A1* | 12/2004 | Wei | H01M 8/2465 |
| | | | 429/434 |
| 2018/0342741 A1* | 11/2018 | Sakano | H01M 8/0258 |
| 2019/0027772 A1* | 1/2019 | Tomana | H01M 8/0265 |

FOREIGN PATENT DOCUMENTS

JP 2013-258106 12/2013

* cited by examiner

*Primary Examiner* — Scott J. Chmielecki
(74) *Attorney, Agent, or Firm* — Finnegan, Henderson, Farabow, Garrett & Dunner, LLP

(57) ABSTRACT

A fuel cell includes an exhaust gas flow path provided between a pair of separators that are arranged across a membrane electrode assembly and a resin frame placed therebetween. The exhaust gas flow path includes a first flow path portion extended from a power generation portion toward a manifold portion; a second flow path portion and a third flow path portion extended side by side on a downstream side of the first flow path portion and including downstream ends respectively connected with the manifold portion; and a linkage part connected with a downstream end of the first flow path portion, an upstream end of the second flow path portion and an upstream end of the third flow path portion. An extended region of the downstream end of the first flow path portion is extended toward the upstream end of the third flow path portion in the linkage part.

16 Claims, 13 Drawing Sheets

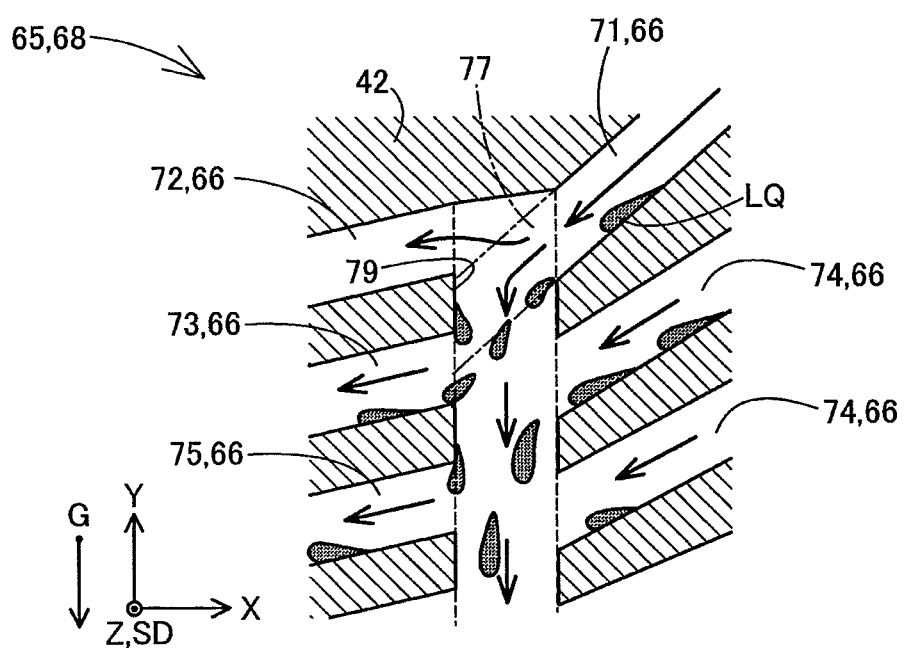

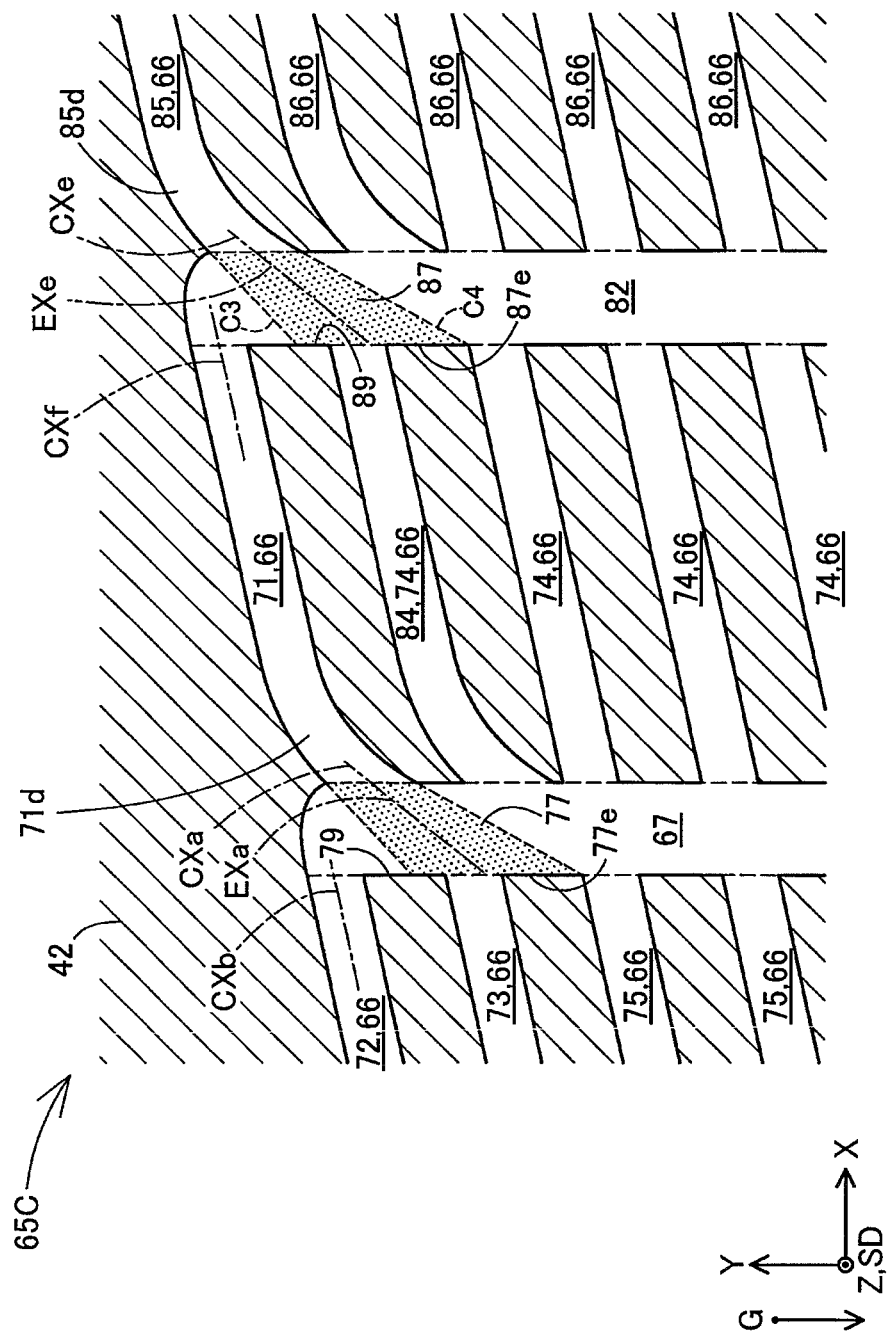

FUEL CELL AND FUEL CELL STACK

CROSS-REFERENCE TO RELATED APPLICATION

The present application claims priority from Japanese patent application 2018-111845 filed on Jun. 12, 2018, the entirety of the content of which is hereby incorporated by reference into this application.

BACKGROUND

Field

The present disclosure relates to a fuel cell and a fuel cell stack.

Related Art

For example, JP 2013-258106A discloses a polymer electrolyte fuel cell that includes a resin frame that is placed around a membrane electrode assembly (MEA) and that is placed along with the membrane electrode assembly between separators. A fuel cell stack is generally configured by stacking a plurality of fuel cells. In this fuel cell, a plurality of gas flow paths that, are connected with a power generation portion including electrodes may be formed by recesses such as grooves formed in the separators and the resin frame.

Among these gas flow paths, a large amount of water as well as an exhaust gas discharged from the power generation portion flows into exhaust gas flow paths which the exhaust gas flows through. In the case where water remains in the exhaust gas flow path after stop of power generation of the fuel cell, the exhaust gas flow path is likely to be blocked by frozen remaining water, for example, in a low temperature environment of a sub-zero temperature. Blocking the exhaust gas flow path fails to cause reactive gases to sufficiently reach the power generation portion and makes it difficult to restart power generation of the fuel cell. Especially when all the exhaust gas flow paths are blocked, this significantly lowers the startability of the fuel cell.

The fuel cell described in JP 2013-258106A is configured to cause the discharged water flowing into the exhaust gas flow path to be introduced into a water discharge passage by the function of the gravity and the guide function of the exhaust gas flow paths and is configured to allow water to flow into all the exhaust gas flow paths. In the fuel cell described in JP 2013-258106A, all the exhaust gas flow paths are likely to be blocked by the remaining water. There is accordingly still room for improvement in suppressing the exhaust gas flow paths from being blocked by water remaining in the exhaust gas flow paths.

SUMMARY

According to a first aspect of the present disclosure, there is provided a fuel cell. The fuel cell of this aspect comprises a membrane electrode assembly; a resin frame placed around a power generation portion of the membrane electrode assembly; a pair of separators arranged across the membrane electrode assembly and the resin frame placed therebetween; a manifold portion provided in periphery of the power generation portion and configured to cause an exhaust gas discharged from the power generation portion to be flowed out from the fuel cell; and an exhaust gas flow path configured by at least one of the pair of separators and the resin frame to introduce the exhaust gas from the power generation portion to the manifold portion. The exhaust gas flow path comprises a first flow path portion that is extended from the power generation portion in a direction toward the manifold portion; a second flow path portion and a third flow path portion that are extended parallel to each other on a downstream side of the first flow path portion and that have downstream ends respectively connected with the manifold portion; and a linkage part that is connected with a downstream end of the first flow path portion, an upstream end of the second flow path portion and an upstream end of the third flow path portion. When being viewed in a direction that the pair of separators are opposed to each other across the resin frame, the first flow path portion is connected with the linkage part, such that an extended region by extending the downstream end of the first flow path portion into the linkage part is extended not toward the upstream end of the second flow path portion but toward the upstream end of the third flow path portion in the linkage part. No flow path extended from the power generation portion is connected in a region of the linkage part on a direction side from the second flow path portion toward the third flow path portion in an array direction of the second flow path portion and the third flow path portion relative to the extended region.

BRIEF DESCRIPTION OF DRAWINGS

FIG. 4B is a diagram illustrating the flows of exhaust gas in the exhaust gas flow path;

FIG. 7 is a schematic plan view illustrating the configuration of an exhaust gas flow path according to a third embodiment;

DESCRIPTION OF EMBODIMENTS

1. First Embodiment

Figure 1:
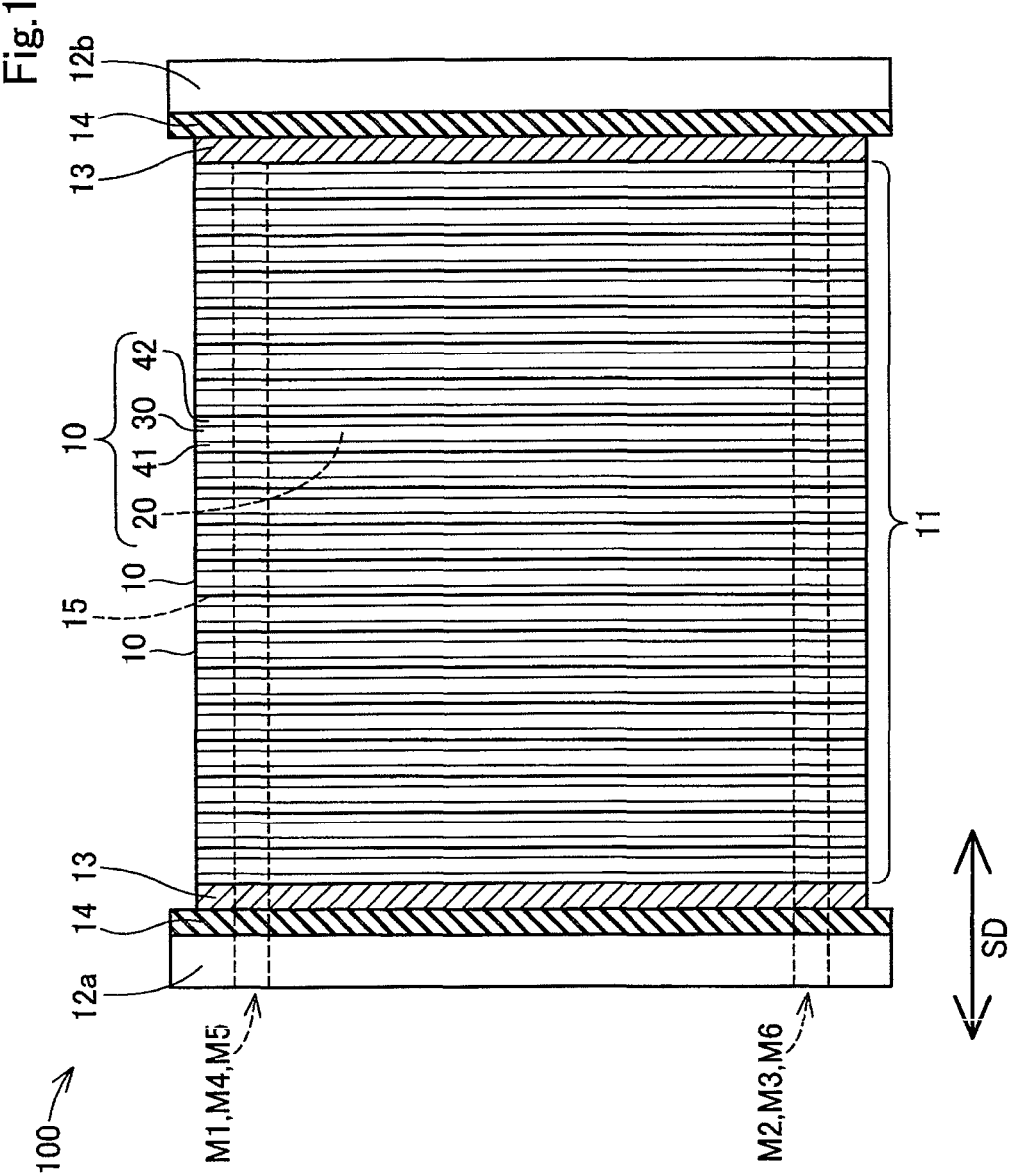
FIG. 1 is a schematic diagram illustrating the configuration of a fuel cell stack according to a first embodiment.

FIG. 1 is a schematic diagram illustrating the configuration of a fuel cell stack 100 including fuel cells 10 according to a first embodiment. The fuel cells 10 are polymer electrolyte fuel cells configured to generate electricity by electrochemical reaction of a fuel gas and an oxidizing gas that are reactive gases. According to the first embodiment, the fuel gas is hydrogen, and the oxidizing gas is oxygen. The fuel cell stack 100 is configured by stacking and clamping a plurality of the fuel cells 10. An arrow illustrated in FIG. 1 indicates a stacking direction SD of the fuel cells 10 in the fuel cell stack 100.

The fuel cell 10 is also called unit cell and is a power generation element that is capable of generating electricity alone. The fuel cell 10 includes a membrane electrode assembly 20 serving as a power generating body, a resin frame 30 placed around the membrane electrode assembly 20, and a pair of separators 41 and 42 arranged to place the membrane electrode assembly 20 and the resin frame 30 therebetween in the stacking direction SD. In FIG. 1, the membrane electrode assembly 20 is placed invisibly inside of the fuel cell stack 100, and its arrangement location is indicated by a broken lead line with the reference sign. The details of the configuration of the fuel cell 10 will be described later.

A seal member 15 called gasket is placed between adjacent fuel cells 10 that are arranged to adjoin to each other in the stacking direction SD. The seal member 15 is invisible from outside of the fuel cell stack 100 and is indicated on a boundary between adjacent fuel cells 10 by a broken lead line with the reference sign in FIG. 1. The seal member 15 is placed to be sandwiched and compressed between the separators 41 and 42 that are opposed to each other and serves to prevent leakage of a fluid from between the adjacent fuel cells 10. The fluid includes, for example, the reactive gases, water generated in the fuel cell stack 100 and a cooling medium used to control the operation temperature of the fuel cell stack 100.

In the fuel cell stack 100, a stacked body 11 by stacking the fuel cells 10 is placed between two end plates 12a and 12b in the stacking direction SD. Each of the end plates 12a and 12b is configured by, for example, a metal plate. The stacked body 11 receives a clamping force along the stacking direction SD that is applied from a clamping member via the first end plate 12a and the second end plate 12b. The illustration of the clamping member is omitted from FIG. 1 as a matter of convenience.

Current collectors 13 and insulating plates 14 are placed between the respective end plates 12a and 12b and the stacked body 11. The current collectors 13 are configured by plate-like members having electrical conductivity. The current collectors 13 are arranged to be in contact with the stacked body 11 and establish electrical continuity with the respective fuel cells 10. The electric power generated in the fuel cell stack 100 is output through the current collectors 13 to the outside. The insulating plates 14 are placed between the current collectors 13 and the respective end plates 12a and 12b to electrically insulate the current collectors 13 from the end plates 12a and 12b.

Manifolds M1 to M6 are provided inside of the fuel cell stack 100 to be connected with power generation portions of the respective fuel cells 10 described later. The respective manifolds M1 to M6 are formed by coupling corresponding manifold portions configured by through holes that are pierced through the respective fuel cells 10 as described later, in the stacking direction SD. The respective manifolds M1 to M6 are arranged around the membrane electrode assemblies 20 of the respective fuel cells 10. In FIG. 1, the positions of the manifolds M1, M4 and M5 are overlapped, and the positions of the manifolds M2, M3 and M6 are overlapped.

The fuel gas supplied to anodes of the respective fuel cells 10 flows in the first manifold M1. The exhaust gas discharged from the anodes of the respective fuel cells 10 flows in the second manifold M2. The oxidizing gas supplied to cathodes of the respective fuel cells 10 flows in the third manifold M3. The exhaust gas discharged from the cathodes of the respective fuel cells 10 flows in the fourth manifold M4. The cooling medium supplied to a cooling medium flow path formed between fuel cells 10 that adjoin to each other in the stacking direction SD flows in the fifth manifold M5. The cooling medium discharged from the cooling medium flow path described above flows in the sixth manifold M6.

Through holes that form ends of the respective manifolds M1 to M6 are provided in the first end plate 12a and in the current collector 13 and the insulating plate 14 on the first end plate 12a-side. Connecting portions are provided in an outer surface of the first end plate 12a to connect respective pipings for the reactive gases and the cooling medium with the corresponding manifolds M1 to M6. The illustration and the detailed description of these connecting portions are omitted.

Figure 2:
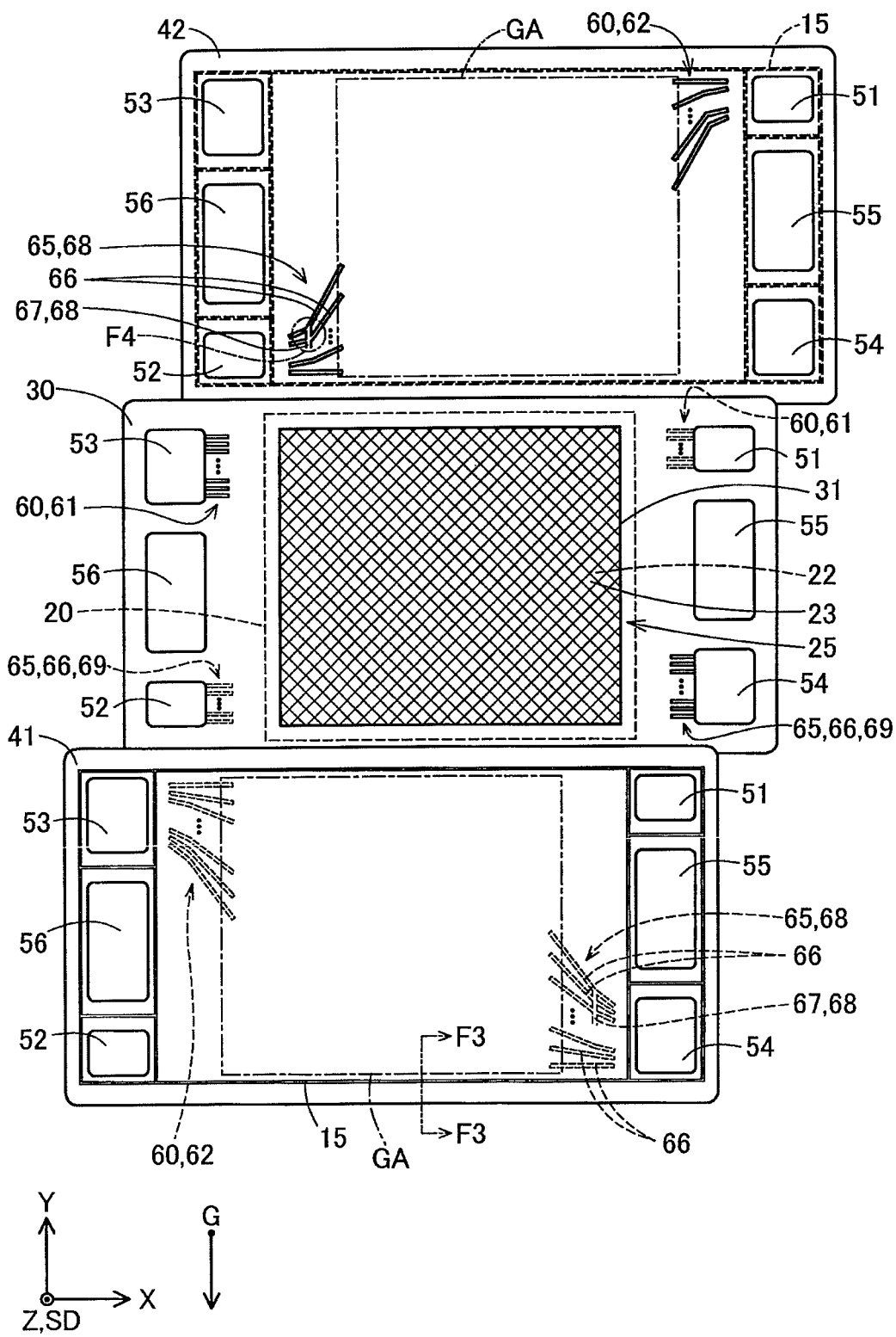
FIG. 2 is a schematic exploded view illustrating a fuel cell according to the first embodiment.
Figure 3:
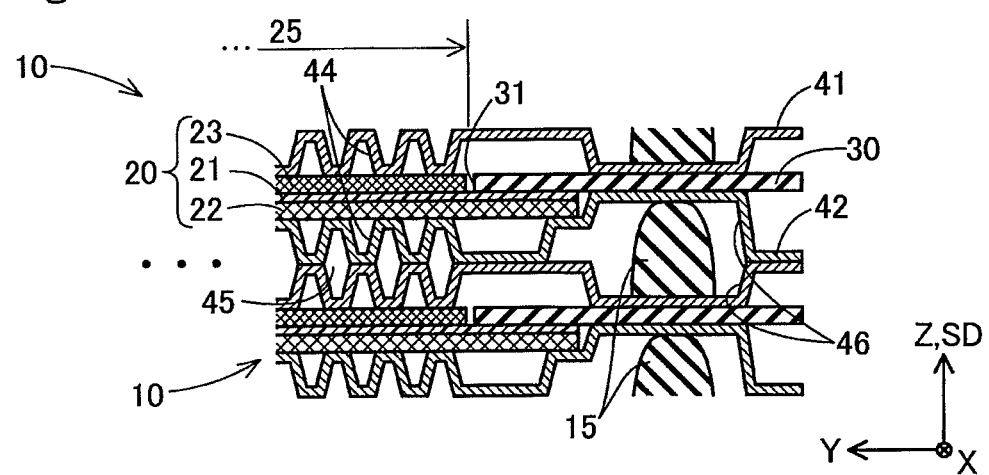
FIG. 3 is a schematic sectional view illustrating the fuel cell according to the first embodiment.

The configuration of the fuel cell 10 is described with reference to FIG. 2 and FIG. 3. FIG. 2 is a schematic exploded view illustrating the fuel cell 10. FIG. 2 illustrates the membrane electrode assembly 20, the resin frame 30, and the pair of separators 41 and 42 when being viewed from a cathode 23-side in the stacking direction SD. FIG. 3 is a schematic sectional view illustrating the fuel cell 10 at a position taken along a line F3-F3 in FIG. 3. FIG. 3 illustrates any two adjacent fuel cells 10 included in the fuel cell stack 100.

An X axis, a Y axis and a Z axis indicating three directions that are orthogonal to one another are illustrated in FIG. 2 and FIG. 3. According to the first embodiment, as shown in FIG. 2, the resin frame 30 and the pair of separators 41 and 42 have approximately rectangular outer circumferential shapes when being viewed in the stacking direction SD. Each of the X axis and the Y axis indicates a direction along respective one sides of the outer circumferences of the resin frame 30 and the separators 41 and 42. In the description below, with regard to an X-axis direction that is the direction along the X axis, a + direction is also called +X direction and a − direction is also called −X direction. Similarly, with regard to a Y-axis direction that is the direction along the Y axis, a + direction is also called +Y direction and a − direction is also called −Y direction. A Z-axis direction that is the direction along the Z axis is parallel to a thickness direction of the resin frame 30 and the separators 41 and 42 and parallel to the stacking direction SD of the fuel cell stack 100. The X axis, the Y axis and the Z axis corresponding to those of FIG. 2 and FIG. 3 are illustrated as appropriate in other drawings that are referred to later.

With reference to FIG. 2, in the fuel cell 10, the membrane electrode assembly 20 is surrounded by the resin frame 30 and is placed between the pair of separators 41 and 42. According to the first embodiment, the membrane electrode assembly 20 is arranged such that an outer circumferential edge thereof overlaps with an inner circumferential edge of the resin frame 30 when being viewed in the stacking direction SD.

With reference to FIG. 3, the membrane electrode assembly 20 includes an electrolyte membrane 21; and an anode 22 and a cathode 23 that are electrode layers placed on respective surfaces of the electrolyte membrane 21. The electrolyte membrane 21 is a thin film of an electrolyte resin having good proton conductivity in the wet state. The electrolyte membrane 21 is formed from, for example, a fluorine-based ion exchange membrane.

Each of the anode 22 and the cathode 23 is made of a conductive material with catalyst particles supported thereon to accelerate the electrochemical reaction of the fuel gas with the oxidizing gas. Each of the anode 22 and the cathode 23 has gas diffusivity to diffuse the gas in a direction along a plane defined by the X axis and the Y axis inside thereof. A region of the membrane electrode assembly 20 where the anode 22 and the cathode 23 are placed is a power generation portion 25 where electricity is generated by the electrochemical reaction of the supplied reactive gases.

According to the first embodiment, a length in the X-axis direction and a length in the Y-axis direction of the cathode 23 are smaller than those of the electrolyte membrane 21 and those of the anode 22. The cathode 23 is placed on a surface of the electrolyte membrane 21 such that an outer circumferential edge thereof is located on the inner side of an outer circumferential edge of the electrolyte membrane 21 and an outer circumferential edge of the anode 22. The outer circumferential edge of the electrolyte membrane 21 extended to outside of the outer circumferential edge of the cathode 23 is joined with an inner circumferential edge of an opening 31 of the resin frame 30. Accordingly, the membrane electrode assembly 20 is supported by the resin frame 30 in the state that the power generation portion 25 of the membrane electrode assembly 20 is placed in the opening 31 formed at the center of the resin frame 30 as shown in FIG. 2. The resin frame 30 is made of a resin material, for example, polyethylene terephthalate (PET). Any of various other thermoplastic resin materials such as polypropylene and polyethylene may also be employed as the resin material.

As shown in FIG. 2, the pair of separators 41 and 42 have such dimensions as to cover substantially entirely the membrane electrode assembly 20 and the resin frame 30 supporting the membrane electrode assembly 20. A region GA shown by the one-dot chain line in FIG. 2 indicates a region of each of the separators 41 and 42 that overlaps with the power generation portion 25 of the membrane electrode assembly 20 in the Z-axis direction. The first separator 41 is a cathode separator facing the cathode 23, and the second separator 42 is an anode separator facing the anode 22.

The separators 41 and 42 are formed from plate-like members having electrical conductivity and gas impermeability. According to the first embodiment, the respective separators 41 and 42 are metal separators and are configured as press-formed plates by press-forming a metal material such as stainless steel or titanium. In another embodiment, the separators 41 and 42 may not be necessarily the metal separators. The separators 41 and 42 may be formed from members, for example, by molding carbon in a plate-like shape.

With reference to FIG. 2, the fuel cell 10 includes manifold portions 51 to 56 provided in the periphery of the power generation portion 25. The manifold portions 51 to 56 are formed by through holes that are pierced through the resin frame 30 and the separators 41 and 42. As described above, in the fuel cell stack 100, the manifold portions 51 to 56 of the respective fuel cells 10 are respectively coupled in the stacking direction SD to form the manifolds M1 to M6 described above with reference to FIG. 1. The manifold portions 51 to 56 respectively form corresponding manifolds M1 to M6 having the same suffix numerals.

The manifold portions 51 and 53 are provided for supplying the reactive gases and serve to cause the reactive gases to be flowed in between the pair of separators 41 and 42 of each fuel cell 10. The manifold portions 52 and 54 are provided for discharging the reactive gases and serve to cause the exhaust gases to be flowed out from between the pair of separators 41 and 42 of each fuel cell 10. The manifold portion 55 is provided for supplying the cooling medium and serves to cause the cooling medium to be flowed in between adjacent fuel cells 10 that are stacked to adjoin to each other in the fuel cell stack 100. The manifold portion 56 is provided for discharging the cooling medium and serves to cause the cooling medium passing through between the fuel cells 10 stacked to adjoin to each other to be flowed out.

The first manifold portion 51 for the supply of the fuel gas is provided on a +X direction side at a +Y direction side end of the power generation portion 25. The second manifold portion 52 for the exhaust gas on the anode 22-side is provided on a −X direction side at a −Y direction side end of the power generation portion 25. The first manifold portion 51 and the second manifold portion 52 are arranged at diagonal positions across the power generation portion 25.

The third manifold portion 53 for the supply of the oxidizing gas is provided on the −X direction side at the +Y direction side end of the power generation portion 25. The fourth manifold portion 54 for the exhaust gas on the cathode 23-side is provided on the +X direction side at the −Y direction side end of the power generation portion 25. The third manifold portion 53 and the fourth manifold portion 54 are arranged at diagonal positions across the power generation portion 25.

The fifth manifold portion 55 for the supply of the cooling medium is provided on the +X direction side of the power generation portion 25 and is placed between the first manifold portion 51 and the fourth manifold portion 54 in the Y-axis direction. The sixth manifold portion 56 for the discharge of the cooling medium is provided on the −X direction side of the power generation portion 25 and is placed between the second manifold portion 52 and the third manifold portion 53 in the Y-axis direction.

The positions where the manifold portions 51 to 56 are formed are not limited to the above positions. The requirement is that the manifold portions 51 to 56 are to be formed in the periphery of the power generation portion 25. According to the first embodiment, the opening areas of the manifold portions 51 and 52 for the fuel gas are smaller than the opening areas of the manifold portions 53 and 54 for the oxidizing gas. The opening widths in the Y-axis direction of the manifold portions 51 and 52 for the fuel gas are smaller than the opening widths in the Y-axis direction of the manifold portions 53 and 54 for the oxidizing gas.

The fuel cell 10 is provided with supply gas flow paths 60 arranged between the pair of separators 41 and 42 to connect the manifold portion 51 or the manifold portion 53 for supplying the reactive gas with the power generation portion 25 and introduce the reactive gas flowing through the manifold portion 51 or through the manifold portion 53 to the power generation portion 25. The supply gas flow paths 60 are provided between the first manifold portion 51 and the power generation portion 25 and between the third manifold portion 53 and the power generation portion 25.

The supply gas flow paths 60 include upstream-side supply flow paths 61 connected with the manifold portion 51 or with the manifold portion 53 for supplying the reactive gas; and downstream-side supply flow paths 62 connected with the power generation portion 25. The upstream-side supply flow paths 61 are defined by spaces between groove-like or slit-like recesses provided in the resin frame 30 and surfaces of the separators 41 and 42 arranged to cover the recesses. The upstream-side supply flow path 61 for the fuel gas is provided on a rear side of the resin frame 30 and is shown in an upper right area of the resin frame 30 by the broken line in FIG. 2.

The downstream-side supply flow paths 62 are defined by spaces between groove-like recesses provided in resin frame 30-side surfaces of the separators 41 and 42 and surfaces of the resin frame 30 arranged to cover the recesses. The downstream-side supply flow path 62 for the oxidizing gas on the cathode 23-side is provided on a rear side of the first separator 41 and is shown in an upper left area of the first separator 41 by the broken line in FIG. 2. The recesses of the separators 41 and 42 constituting the downstream-side supply flow paths 62 may be formed by pressing and bending base members of the separators 41 and 42 in the thickness direction to provide concavity and convexity. The recesses of the separators 41 and 42 may also be formed by grooving, for example, etching, the surfaces of the base members of the separators 41 and 42. As described above, the supply gas flow paths 60 are defined by at least one of the pair of separators 41 and 42 and the resin frame 30.

The fuel cell 10 is provided with exhaust gas flow paths 65 arranged to connect the power generation portion 25 with the manifold portion 52 and with the manifold portion 54 for the exhaust gas and introduce the exhaust gas to the manifold portion 52 or to the manifold portion 54. The exhaust gas flow paths 65 are provided in the pair of separators 41 and 42. The exhaust gas includes the reactive gas that is not used for power generation in the power generation portion 25 and water generated in the power generation portion 25.

The plurality of exhaust gas flow paths 65 are provided between the power generation portion 25 and the second manifold portion 52 and between the power generation portion 25 and the fourth manifold portion 54. Like the supply gas flow paths 60, the exhaust gas flow paths 65 are defined by at least one of the pair of separators 41 and 42 and the resin frame 30. The exhaust gas flow paths 65 include portions formed as separator-side flow path portions 68 provided on the separator 41-side and on the separator 42-side and portions formed as resin frame-side flow path portions 69 provided on the resin frame 30-side.

The separator-side flow path portions 68 are defined by spaces between groove-like recesses provided in the resin frame 30-side surfaces of the separators 41 and 42 and the surfaces of the resin frame 30 arranged to face the recesses. The separator-side flow path portion 68 for the exhaust gas on the cathode 23-side is provided on the rear side of the first separator 41 and is shown in a lower right area of the first separator 41 by the broken line in FIG. 2.

In the description below, the recesses of the separators 41 and 42 provided to form the separator-side flow path portions 68 are called "separator-side recesses". According to the first embodiment, the separator-side recesses are formed by pressing and bending the base members of the separators 41 and 42 in the thickness direction to provide concavity and convexity. According to another embodiment, the separator-side recesses may be formed by grooving, for example, etching, the surfaces of the base members of the separators 41 and 42, instead of pressing.

The resin frame-side flow path portions 69 are defined by spaces between groove-like recesses provided in the resin frame 30 and the surfaces of the separators 41 and 42 arranged to face the recesses. The resin frame-side flow path portion 69 for the exhaust gas on the anode 22-side is provided on the rear side of the resin frame 30 and is shown in a lower left area of the resin frame 30 by the broken line in FIG. 2.

In the description blow, the recesses of the resin frame 30 provided to form the resin frame-side flow path portions 69 are called "frame-side recesses". According to the first embodiment, the frame-side recesses are bottomed recesses formed by locally recessing the surface of the resin frame 30. According to another embodiment, the frame-side recesses may be structures passing through the resin frame 30, for example, slits or through holes.

The exhaust gas flow paths 65 include a plurality of parallel flow paths 66 extended in parallel from the power generation portion 25 toward the manifold portion 52 or toward the manifold portion 54; and linkage flow paths 67 respectively extended in directions intersecting with the parallel flow paths 66. Upstream ends of the parallel flow paths 66 are connected with the power generation portion 25, and the upstream side of the parallel flow paths 66 is configured by the separator-side flow path portions 68. Downstream ends of the parallel flow paths 66 are connected with the manifold portion 52 or with the manifold portion 54, and the downstream side of the parallel flow paths 66 is configured by the resin frame-side flow path portions 69. In the parallel flow paths 66, downstream ends of the separator-side flow path portions 68 and upstream ends of the resin frame-side flow path portions 69 of the parallel flow paths 66 overlap with each other in the Z direction, so that the upstream side and the downstream side of the parallel flow paths 66 are connected with each other.

The plurality of parallel flow paths 66 are extended to gather from the power generation portion 25 toward the manifold portion 52 or toward the manifold portion 54 such that the interval between the upstream ends on the power generation portion 25-side is wider than the interval between the downstream ends on the manifold portion 52-side and on the manifold portion 54-side. This configuration enables the exhaust gas to be efficiently collected from a wider range in the power generation portion 25 to the manifold portion 52 or to the manifold portion 54. As described above, in the fuel cell 10 of the first embodiment, the opening widths in the Y-axis direction of the manifolds M1 and M2 for the fuel gas are smaller than the opening widths in the Y-axis direction of the manifolds M3 and M4 for the oxidizing gas. According to the first embodiment, the number of the anode-side parallel flow paths 66 is thus smaller than the number of the cathode-side parallel flow paths 66.

The linkage flow path 67 serves as a linkage part of linking at least part of the parallel flow paths 66. According to the first embodiment, the linkage flow paths 67 are configured as the separator-side flow path portions 68. According to the first embodiment, the linkage flow path 67 is extended along the Y-axis direction and is connected with flow paths arranged on the +Y direction side out of the parallel flow paths 66, while not being connected with flow paths arranged on the −Y direction side. According to other embodiments, the linkage flow paths 67 may be connected with all the parallel flow paths 66, may be connected with only flow paths arranged on the −Y direction side, or may be connected with only flow paths arranged in a middle region in the Y-axis direction of the parallel flow paths 66. It is preferable that the parallel flow paths 66 and the linkage flow paths 67 have such flow passage areas that do not cause a liquid component included in the exhaust gas to be kept and accumulated by the capillary force.

In the exhaust gas flow paths 65, the parallel flow paths 66 and the linkage flow paths 67 are connected such that a flow path having a reduced amount of the liquid component contained in the in-flow exhaust gas is formed in part of the parallel flow paths 66 connected by the linkage flow path 67. The details will be described later.

With reference to FIG. 3, gas flow path grooves 44 are formed over the entire region GA facing the power generation portion 25 in inner surfaces that are membrane electrode assembly 20-side surfaces of the separators 41 and 42 to form the flow paths of the reactive gases. Cooling medium flow path grooves 45 are formed in outer surfaces of the separators 41 and 42 on the opposite side to form the flow paths of the cooling medium. The plan view of the gas flow path grooves 44 and the cooling medium flow path grooves 45 is omitted from the illustration of FIG. 2 as a matter of convenience. In the description hereof, the description on the configuration of flow paths arranged to connect the cooling medium flow path grooves 45 with the manifold portions 55 and 56 for the cooling medium is omitted.

As shown in FIG. 3, groove-like seal placing recesses 46 are provided in the outer surfaces of the separators 41 and 42 on the opposite side to the resin frame 30 to form a space for placing therein the seal member 15 described above with reference to FIG. 1. The seal member 15 is arranged to surround the power generation portion 25 and the respective manifold portions 51 to 56 when being viewed in the stacking direction SD as shown in FIG. 2. The seal placing recesses 46 are omitted from the illustration of FIG. 2 as a matter of convenience.

Refer to FIG. 2. An arrow G shown in FIG. 2 indicates the direction of gravity. The arrow G indicating the direction of gravity corresponding to that of FIG. 2 is illustrated in other drawings that are referred to later. The fuel cell stack 100 of the first embodiment is arranged such that its −Y direction side is the lower side in the direction of gravity during power generation. More specifically, the fuel cell stack 100 is arranged such that the manifold portions 51 and 53 for supplying the reactive gases are placed on the upper side in the direction of gravity and the manifold portions 52 and 54 for the exhaust gases are placed on the lower side in the direction of gravity during power generation. This arrangement causes the reactive gases to flow from the upper side to the lower side in the direction of gravity both on the anode 22-side and on the cathode 23-side in the power generation portion 25 during power generation. Water generated in the power generation portion 25 accordingly moves downward in the power generation portion 25 by the gravity and is thus readily dischargeable from the power generation portion 25.

Figure 4A:
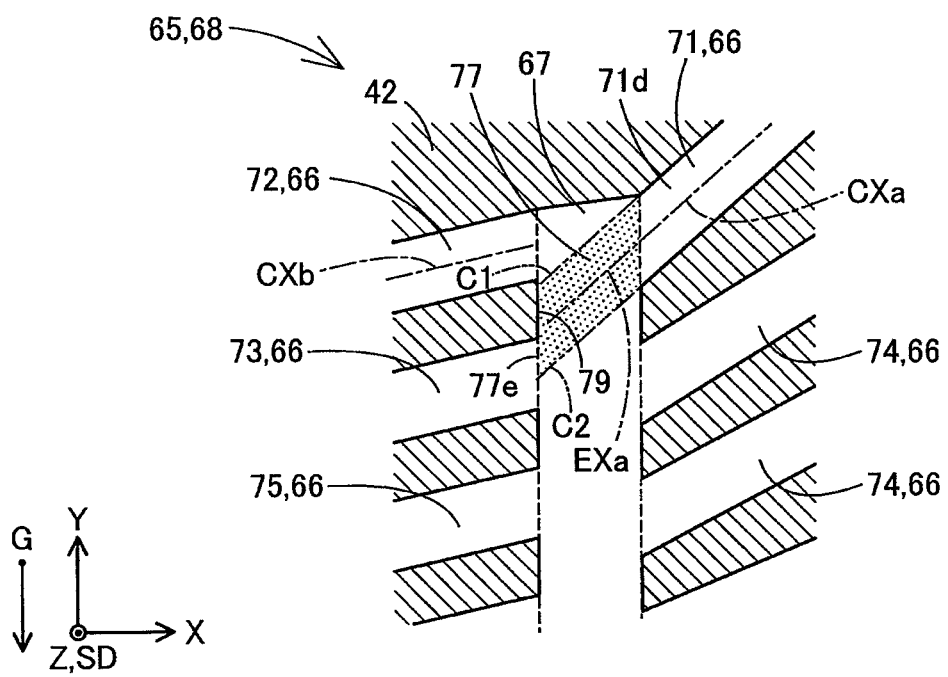
FIG. 4A is a schematic diagram illustrating part of an exhaust gas flow path according to the first embodiment.
Figure 5:
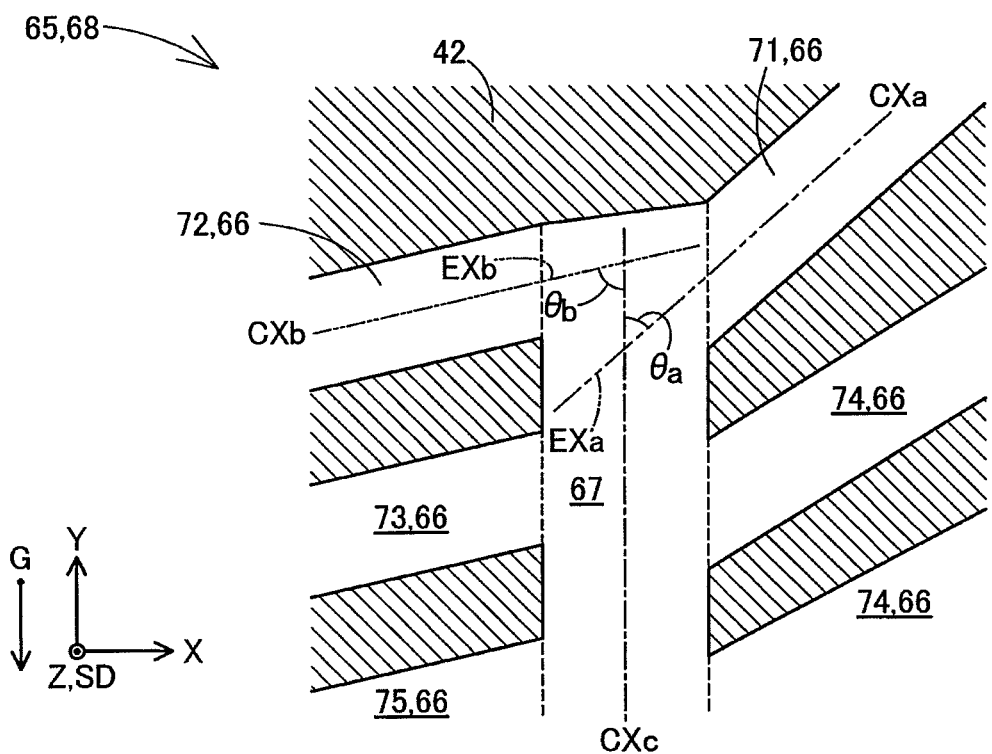
FIG. 5 is a schematic diagram illustrating angles of intersection of a first flow path portion, a second flow path portion and a connection flow path.

The flow path configuration of the exhaust gas flow paths 65 according to the first embodiment is described by sequentially referring to FIG. 4A, FIG. 4B and FIG. 5. FIG. 4A is a schematic plan view illustrating part of the exhaust gas flow paths 65 included in a region F4 shown in FIG. 2 when being viewed in the stacking direction SD that is the direction in which the pair of separators 41 and 42 are opposed to each other across the resin frame 30. For the purpose of convenience, internal spaces of the exhaust gas flow paths 65 are shown by open spaces, and parts of the separator 42 forming wall portions of the exhaust gas flow paths 65 are shown by hatched areas in FIG. 4A.

The following description on the configuration of the exhaust gas flow paths 65 is based on the view in the direction in which the pair of separators 41 and 42 are opposed to each other across the resin frame 30, unless otherwise specified. The following describes the configuration of the anode-side exhaust gas flow paths 65. In the fuel cell 10 of the first embodiment, the cathode-side exhaust gas flow paths 65 have a similar configuration to that of the anode-side exhaust gas flow paths 65. When the following description on the anode-side exhaust gas flow paths 65 is applied to the cathode-side exhaust gas flow paths 65, the second manifold portion 52 should be replaced by the fourth manifold portion 54, and the positive and negative signs of the +X direction and the −X direction should be exchanged.

The parallel flow paths 66 of the exhaust gas flow paths 65 include a first flow path portion 71 on the upstream side of the linkage flow path 67 and a second flow path portion 72 and a third flow path portion 73 on the downstream side of the linkage flow path 67. The first flow path portion 71 is extended in a direction from the power generation portion 25 toward the second manifold portion 52 and has a downstream end that is connected with the linkage flow path 67. According to the first embodiment, a downstream side portion 71d of the first flow path portion 71 is extended obliquely from the power generation portion 25 toward the −X direction side and the −Y direction side to be connected with the linkage flow path 67.

The second flow path portion 72 and the third flow path portion 73 are extended in parallel from the linkage flow path 67 and have respective upstream ends that are connected with the linkage flow path 67. In the description hereof, the expression of "extended in parallel" may be rephrased by "extended side by side" and is not limited to the configuration of extending in parallelism but includes the configuration of extending in directions intersecting with each other. The second flow path portion 72 and the third flow path portion 73 are adjacent to each other in an array direction of the parallel flow paths 66. The second flow path portion 72 is located on the +Y direction side, and the third flow path portion 73 is located on the −Y direction side.

Respective downstream ends of the second flow path portion 72 and the third flow path portion 73 are individually connected with the second manifold portion 52 as shown in FIG. 2. According to the first embodiment, upstream side portions of the second flow path portion 72 and the third flow path portion 73 are configured as the separator-side flow path portions 68, like the first flow path portion 71 and the linkage flow path 67. Downstream side portions of the second flow path portion 72 and the third flow path portion 73 are configured as the resin frame-side flow path portions 69.

According to the first embodiment, the parallel flow paths 66 also include upstream side flow path portions 74 other than the first flow path portion 71 on the upstream side of the linkage flow path 67. The upstream side flow path portions 74 are provided on the −Y direction side of the first flow path portion 71, are extended from the power generation portion 25 toward the second manifold portion 52, and have downstream ends that are connected with the linkage flow path 67. According to the first embodiment, the first flow path portion 71 and the upstream side flow path portions 74 that are flow paths on the upstream side of the linkage flow path 67 are extended radially from the linkage flow path 67 toward the power generation portion 25. According to other embodiments, the upstream side flow path portions 74 may be omitted or may not be extended radially from the linkage flow path 67 toward the power generation portion 25.

According to the first embodiment, the parallel flow paths 66 also include downstream side flow path portions 75 other than the second flow path portion 72 and the third flow path portion 73 on the downstream side of the linkage flow path 67. The downstream side flow path portions 75 are located on the −Y direction side of the third flow path portion 73 and have upstream ends that are connected with the linkage flow path 67 and downstream ends that are connected with the second manifold portion 52. Upstream side portions of the downstream side flow path portions 75 are configured as the separator-side flow path portions 68, like the second flow path portion 72 and the third flow path portion 73, and downstream side portions of the downstream side flow path portions 75 are configured as the frame-side flow path portions 69. According to another embodiment, the downstream side flow path portions 75 may be omitted.

The downstream end of the first flow path portion 71 is located on the most upstream side in the linkage flow path 67. No flow path extended from the power generation portion 25 is connected in a region of the linkage flow path 67 on the direction side from the third flow path portion 73 toward the second flow path portion 72 in the array direction of the second flow path portion 72 and the third flow path portion 73, relative to the downstream end of the first flow path portion 71. In other words, no flow path extended from the power generation portion 25 is connected in a region on the +Y direction side of the downstream end of the first flow path portion 71 in the linkage flow path 67. The first flow path portion 71 is located on the outermost side in the array direction of the parallel flow paths 66 among the flow paths having the downstream ends that are connected with the linkage flow path 67.

The downstream side portion 71*d* of the first flow path portion 71 is connected with the linkage flow path 67 such as to be inclined in the −Y direction that is the direction from the second flow path portion 72 toward the third flow path portion 73. The downstream end of the first flow path portion 71 is located on the direction side from the second flow path portion 72 toward the third flow path portion 73, i.e., on the +Y direction side relative to the upstream end of the second flow path portion 72 when being viewed in a center axis direction parallel to a center axis CXa at the downstream end of the first flow path portion 71.

In the description hereof, a center axis of a flow path means a virtual axis interconnecting centers in flow path sections perpendicular to the flow path. A center axis at a downstream end or an upstream end of a flow path means a center axis at the center position in an opening forming the downstream end or the upstream end of the flow path.

A dot-filled area shown in FIG. 4A indicates an extended region 77 by extending the downstream end of the first flow path portion 71 into the linkage flow path 67. The extended region 77 of the downstream end of the first flow path portion 71 is a region defined by a tangent line C1 of a +Y direction side wall surface and a tangent line C2 of a −Y direction side wall surface that form the downstream end of the first flow path portion 71.

The extended region 77 is extended in a direction along an extension axis EXa by extending the center axis CXa at the downstream end of the first flow path portion 71 into the linkage flow path 67. The extension axis EXa is extended in a direction obliquely intersecting with a center axis CXb at the upstream end of the second flow path portion 72 toward a region on the upstream end side of the third flow path portion 73 relative to the upstream end of the second flow path portion 72.

An end 77*e* in the extending direction of the extended region 77 is located on the upstream end side of the third flow path portion 73, i.e., on the −Y direction side, relative to the upstream end of the second flow path portion 72, in the linkage flow path 67. The upstream end of the second flow path portion 72 does not have any portion overlapping with the end 77*e* of the extended region 77. According to the first embodiment, the end 77*e* of the extended region 77 has a portion overlapping with the upstream end of the third flow path portion 73. According to another embodiment, the upstream end of the third flow path portion 73 may be located on the −Y direction side of the end 77*e* of the extended region 77 such as not to have any portion overlapping with the end 77*e* of the extended region 77.

The extended region 77 is extended toward a region without the upstream end of the second flow path portion 72 but with the third flow path portion 73 when being viewed from the upstream end of the second flow path portion 72. In other words, the first flow path portion 71 is connected with the linkage flow path 67 such that the extended region 77 by extending the downstream end of the first flow path portion 71 into the linkage flow path 67 is extended not toward the upstream end of the second flow path portion 72 but toward the upstream end of the third flow path portion 73.

The exhaust gas flow paths 65 include an intersecting wall surface portion 79 that is extended from the upstream end of the second flow path portion 72 in a direction intersecting with the center axis CXb at the upstream end of the second flow path portion 72. The intersecting wall surface portion 79 is located on the direction side from the second flow path portion 72 toward the third flow path portion 73 in the array direction of the second flow path portion 72 and the third flow path portion 73 relative to the upstream end of the second flow path portion 72. According to the first embodiment, the intersecting wall surface portion 79 forms part of the wall surface of the linkage flow path 67 and is located between the upstream end of the second flow path portion 72 and the upstream end of the third flow path portion 73.

The intersecting wall surface portion 79 is extended from the upstream end of the second flow path portion 72 in such a direction that intersects with a direction perpendicular to the center axis CXa at the downstream end of the first flow path portion 71 and that is away from the downstream end of the first flow path portion 71. The intersecting wall surface portion 79 intersects with the center axis CXa at the downstream end of the first flow path portion 71 such as to be inclined in the direction from the second flow path portion 72 toward the third flow path portion 73. The intersecting wall surface portion 79 intersects with and is inclined to the center axis CXa at the downstream end of the first flow path portion 71, such that the third flow path portion 73-side angle is larger than the second flow path portion 72-side angle in an angle between the intersecting wall surface portion 79 and the center axis CXa at the downstream end of the first flow path portion 71. According to the first embodiment, the downstream end of the first flow path portion 71 is opposed to the intersecting wall surface portion 79 and to the upstream end of the third flow path portion 73 in the center axis direction parallel to the center axis CXa.

In the fuel cell 10, the first flow path portion 71, the second flow path portion 72 and the third flow path portion 73 are connected with the linkage flow path 67 as described above. This configuration suppresses the liquid component included in the exhaust gas from entering the second flow path portion 72 as described below.

The flow of the exhaust gas in the exhaust gas flow paths 65 is described with reference to FIG. 4B. FIG. 4B schematically illustrates arrows indicating the flow of a gas component of the exhaust gas and a liquid component LQ included in the exhaust gas in the exhaust gas flow paths 65 shown in FIG. 4A.

The liquid component LQ of the exhaust gas, along with the gas component of the exhaust gas, flows from the power generation portion 25 through the respective parallel flow paths 66 into the linkage flow path 67. The gas component of the exhaust gas has the smaller momentum and is more likely to change the moving direction, compared with the liquid component LQ. The gas component of the exhaust gas flowing out of the first flow path portion 71 into the linkage flow path 67 is diffused in the linkage flow path 67 and is branched off to be flowed through the linkage flow path 67 into the second flow path portion 72, the third flow path portion 73 and the downstream side flow path portions 75. The same applies to the gas component of the exhaust gas flowing out of the upstream side flow path portions 74 other than the first flow path portion 71 into the linkage flow path 67.

The liquid component LQ of the exhaust gas flowing out of the first flow path portion 71 into the linkage flow path 67, on the other hand, has the larger momentum than the gas component, so that most of the liquid component LQ moves by the moment of inertia along the extended region 77 at the downstream end of the first flow path portion 71 toward the intersecting wall surface portion 79. The component of the inertial force along the Y-axis direction causes the liquid component LQ to move in the −Y direction through the linkage flow path 67 into the third flow path portion 73 and the other downstream side flow path portions 75 on the downstream side of the linkage flow path 67. According to the first embodiment, the intersecting wall surface portion 79 is inclined in the direction from the second flow path portion 72 toward the third flow path portion 73 relative to the center axis CXa at the downstream end of the first flow path portion 71 as described above. Accordingly, the liquid component LQ of the exhaust gas is introduced along the intersecting wall surface portion 79 from the upstream end of the second flow path portion 72 toward the upstream end of the third flow path portion 73. The liquid component LQ of the exhaust gas flowing out of the other upstream side flow path portions 74 other than the first flow path portion 71 into the linkage flow path 67 also moves in the −Y direction along the linkage flow path 67 and flows into the third flow path portion 73 and the other downstream side flow path portions 75.

As described above, the flow path configuration of the exhaust gas flow paths 65 causes the liquid component LQ having the larger momentum in the exhaust gas in the first flow path portion 71 to be introduced not toward the second flow path portion 72 but toward the third flow path portion 73. The flow path configuration causes part of the gas component that has the smaller momentum and that is separated from the liquid component LQ to flow into the second flow path portion 72. As described above, the downstream end of the first flow path portion 71 is located on the most upstream side in the linkage flow path 67, and the region on the +Y direction side of the extended region 77 of the first flow path portion 71 has no flow path extended from the power generation portion 25 and connected with the linkage flow path 67. Accordingly, there is little possibility that the liquid component LQ of the exhaust gas flows from any portion other than the first flow path portion 71 into the second flow path portion 72.

This configuration suppresses the liquid component LQ of the exhaust gas from flowing into the second flow path portion 72 during power generation of the fuel cell stack 100 and reduces the amount of water flowing into the second flow path portion 72 to be lower than the amounts of water flowing into the third flow path portion 73 and the other downstream side flow path portions 75. Even when the liquid component LQ enters the second flow path portion 72, the liquid component LQ is discharged to the downstream of the second flow path portion 72 by the pressure of the gas component flowing into the second flow path portion 72. This configuration suppresses the second flow path portion 72 from being blocked by the liquid component LQ and thereby suppresses a large amount of water from remaining in the second flow path portion 72 after stop of power generation of the fuel cell stack 100. This accordingly suppresses all the exhaust gas flow paths 65 from being blocked by the frozen remaining water and reduces difficulty in a restart of power generation of the fuel cell stack 100 in a low temperature environment of the sub-zero ambient temperature.

In the fuel cell 10 according to the first embodiment, the second flow path portion 72 is arranged on the upper side in the direction of gravity and the third flow path portion 73 is arranged on the lower side in the direction of gravity during power generation. This configuration causes the liquid component LQ of the exhaust gas to be introduced through the linkage flow path 67 toward the flow path portions 73 and 75 lower than the second flow path portion 72 by the action of gravity. This configuration thereby further suppresses the liquid component LQ of the exhaust gas from flowing into the second flow path portion 72.

In the fuel cell 10 according to the first embodiment, the number of the anode-side parallel flow paths 66 is smaller than the number of the cathode-side parallel flow paths 66 as described above. According to the first embodiment, the configuration including the second flow path portion 72 is applied to the anode-side exhaust gas flow paths 65 having the smaller number of the parallel flow paths 66. This configuration suppresses the anode-side exhaust gas flow paths 65 having the smaller number of the parallel flow paths 66 relative to the discharge amount of water from being blocked by the discharged water. In the fuel cell 10 according to the first embodiment, the configuration including the second flow path portion 72 is also applied to the cathode-side exhaust gas flow paths 65 to suppress the inflow of the liquid component LQ and thereby further suppress the exhaust gas flow paths 65 from being blocked by the remaining water.

The angles of intersection of the first flow path portion 71, the second flow path portion 72 and the third flow path portion 73 are described with reference to FIG. 5. θa denotes a +Y direction-side angle, i.e., a second flow path portion 72-side angle in an angle between a center axis CXc of the linkage flow path 67 and the extension axis EXa by extending the center axis CXa at the downstream end of the first flow path portion 71 into the linkage flow path 67. θb denotes a −Y-direction side angle, i.e., a third flow path portion 73-side angle in an angle between the center axis CXc of the linkage flow path 67 and an extension axis EXb by extending the center axis CXb at the downstream end of the second flow path portion 72 into the linkage flow path 67. It is preferable that θb is larger than θa. It is also preferable to have the greater difference between θa and θb. This configuration causes the liquid component LQ of the exhaust gas flowing from the first flow path portion 71 into the linkage flow path 67 to be more effectively introduced not toward the second flow path portion 72 but toward the third flow path portion 73. This further effectively suppresses the liquid component LQ of the exhaust gas from entering the second flow path portion 72.

As described above, the configuration of the fuel cell 10 and the fuel cell stack 100 according to the first embodiment suppresses the liquid component LQ of the exhaust gas from flowing into the second flow path portion 72 in the exhaust gas flow paths 65. This configuration accordingly suppresses water from remaining in the second flow path portion 72 after stop of power generation of the fuel cell stack 100. This suppresses all the exhaust gas flow paths 65 from being blocked by the frozen remaining water and reduces difficulty in a restart of power generation in the low temperature environment. Additionally, the fuel cell 10 and the fuel cell stack 100 according to the first embodiment have various functions and advantageous effects explained above in the description of the first embodiment.

2. Second Embodiment

Figure 6A:
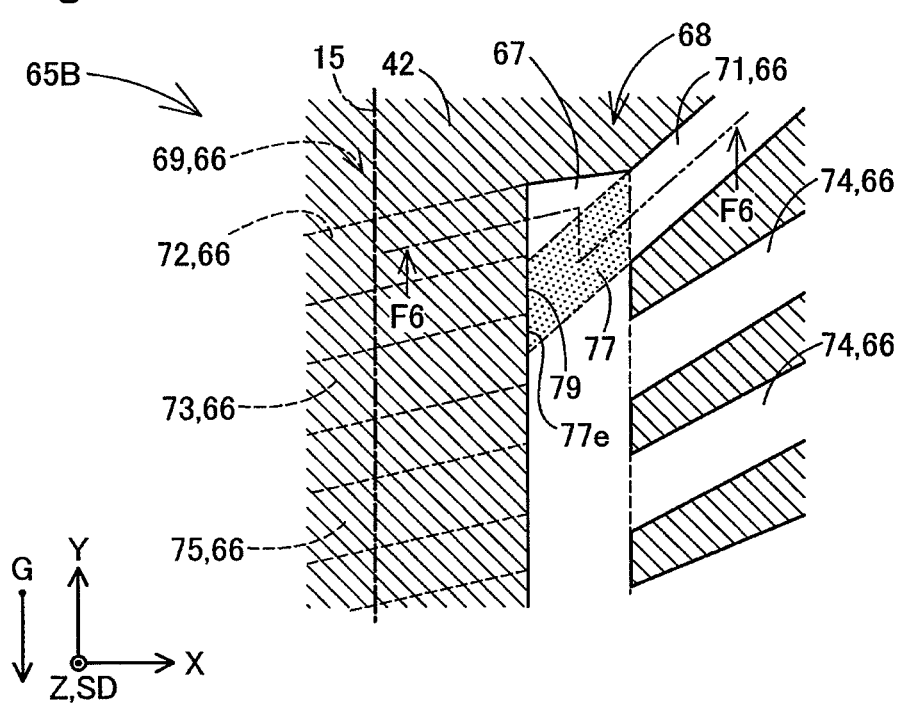
FIG. 6A is a schematic plan view illustrating the configuration of an exhaust gas flow path according to a second embodiment.
Figure 6B:
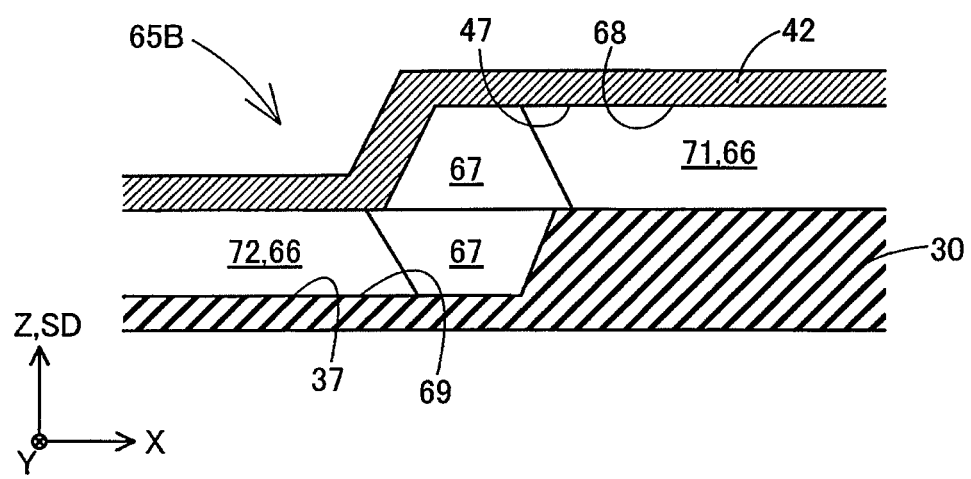
FIG. 6B is a schematic sectional view illustrating the configuration of the exhaust gas flow path according to the second embodiment.

The configuration of exhaust gas flow paths 65B provided in a fuel cell according to a second embodiment is described with reference to FIG. 6A and FIG. 6B. FIG. 6A is a schematic plan view illustrating part of the exhaust gas flow paths 65B according to the second embodiment when being viewed along the stacking direction SD. Like FIG. 4A, internal spaces of the anode-side exhaust gas flow paths 65B are shown by open spaces, and parts of a separator 42 forming wall portions of the exhaust gas flow paths 65B are shown by hatched areas in FIG. 6A. FIG. 6B is a schematic sectional view illustrating the fuel cell according to the second embodiment, taken along a line F6-F6 in FIG. 6A.

The configuration of the fuel cell and a fuel cell stack according to the second embodiment is substantially similar to the configuration of the fuel cell 10 and the fuel cell stack 100 according to the first embodiment, except the exhaust gas flow paths 65B of the second embodiment. The configuration of the exhaust gas flow paths 65B of the second embodiment is substantially similar to the configuration of the exhaust gas flow paths 65 of the first embodiment, except differences specifically described below. The configuration of the exhaust gas flow paths 65B is common to the anode side and the cathode side in the fuel cell and the fuel cell stack according to the first embodiment, like the first embodiment.

In the exhaust gas flow paths 65B, a first flow path portion 71 is formed as a separator-side flow path portion 68 like the first embodiment. More specifically, the first flow path portion 71 is defined by a space between a separator-side recess 47 provided in the resin frame 30-side surface of the separator 41 or 42 and the resin frame 30. Other upstream side flow path portions 74 other than the first flow path portion 71 are similarly formed as separator-side flow path portions 68.

In the exhaust gas flow paths 65B, upstream side portions of a second flow path portion 72 and a third flow path portion 73 are formed as resin frame-side flow path portions 69, unlike the first embodiment. More specifically, the second flow path portion 72 and the third flow path portion 73 are defined by spaces between frame-side recesses 37 of the resin frame 30 and the surface of the separator 41 or 42 arranged to face the frame-side recesses 37 from the upstream end to the downstream end. Other downstream side flow path portions 75 are similarly formed as resin frame-side flow path portions 69 over the upstream end to the downstream end. In FIG. 6A, the resin frame-side flow path portions 69 are covered by the separators 41 and 42 to be invisible, so that their positions are shown by the broken line.

With reference to FIG. 6B, in the exhaust gas flow paths 65B, a linkage flow path 67 is defined by a space formed by the separator-side recess 47 and the frame-side recess 37 opposed to each other. More specifically, the linkage flow path 67 is configured by stacking a portion formed as the separator-side flow path portion 68 and a portion formed as the resin frame-side flow path portion 69 in the stacking direction SD. Accordingly, in the exhaust gas flow paths 65B, an intersecting wall surface portion 79 is configured by part of the separator 41 or 42 and part of the resin frame 30. The intersecting wall surface portion 79 is not shown in FIG. 6B.

In the exhaust gas flow paths 65B according to the second embodiment, as shown in FIG. 6B, a downstream end of the first flow path portion 71 and an upstream end of the second flow path portion 72 are open in the linkage flow path 67 at positions away from each other in the Z-axis direction. This configuration further suppresses the liquid component of the exhaust gas flowing out from the downstream end of the first flow path portion 71 from flowing into the second flow path portion 72.

The position where a seal member 15 described in the first embodiment with reference to FIG. 2 and FIG. 3 is placed is shown by the one-dot chain line in FIG. 6A. The second flow path portion 72, the third flow path portion 73 and the other downstream side flow path portions 75 that are the resin frame-side flow path portions 69 on the downstream side of the linkage flow path 67 are located below the seal member 15 and are extended to intersect with the seal member 15 when the fuel cell 10 is viewed in the stacking direction SD.

The flow path diameter of the resin frame-side flow path portion 69 is likely to be reduced by compression of the resin frame 30 in the thickness direction under application of a pressing force from the seal member 15 via the separators 41 and 42. The exhaust gas flow paths 65B are configured to suppress the liquid component of the exhaust gas from entering the second flow path portion 72. Even when the flow path diameter of the resin frame-side flow path portion 69 is reduced by the seal member 15, this configuration suppresses at least the second flow path portion 72 from being blocked by the liquid component. This configuration also allows the resin frame-side flow path portion 69 to be designed to have a smaller flow path diameter intersecting with the seal member 15, in order to obtain a reactive force for supporting the seal member 15.

As described above, the configuration of the fuel cell including the exhaust gas flow paths 65B and the fuel cell stack according to the second embodiment more effectively suppresses the liquid component of the exhaust gas from entering the second flow path portion 72. The fuel cell and the fuel cell stack of the second embodiment have various functions and advantageous effects similar to those described in the first embodiment, in addition to the various functions and advantageous effects explained above in the description of the second embodiment.

3. Third Embodiment

FIG. 7 is a schematic plan view illustrating part of exhaust gas flow paths 65C according to a third embodiment when being viewed along the stacking direction SD. Like FIG. 4A, internal spaces of the anode-side exhaust gas flow paths 65C are shown by open spaces, and parts of a separator 42 forming wall portions of the exhaust gas flow paths 65C are shown by hatched areas in FIG. 7.

The configuration of the fuel cell and a fuel cell stack according to the third embodiment is substantially similar to the configuration of the fuel cell 10 and the fuel cell stack 100 according to the first embodiment, except the exhaust gas flow paths 65C of the third embodiment. The configuration of the exhaust gas flow paths 65C of the third embodiment is substantially similar to the configuration of the exhaust gas flow paths 65 of the first embodiment, except differences specifically described below. The configuration of the exhaust gas flow paths 65C is common to the anode side and the cathode side in the fuel cell and the fuel cell stack according to the third embodiment, like the first embodiment. The following description on the configuration of the exhaust gas flow paths 65C is based on the view in a direction that the pair of separators 41 and 42 are opposed to each other across the resin frame 30, unless otherwise specified.

The exhaust gas flow paths 65C of the third embodiment include another linkage flow path 82 that is provided on the upstream side of a linkage flow path 67 or more specifically between the linkage flow path 67 and the power generation portion 25 and that is extended to intersect with parallel flow paths 66. In the description below, for the purpose of discrimination, the downstream-side linkage flow path 67 is called "first linkage flow path 67", and the upstream-side linkage flow path 82 is called "second linkage flow path 82".

An upstream end of a first flow path portion 71 and upstream ends of other upstream side flow path portions 74 extended parallel to the first flow path portion 71 are connected with the second linkage flow path 82. In the description below, one of the upstream side flow path portions 74 that is located on the −Y direction side of the first flow path portion 71 and that is adjacent to and parallel to the first flow path portion 71 is specifically called "fourth flow path portion 84". A downstream end of the fourth flow path portion 84, along with a downstream end of the first flow path portion 71, is connected with the first linkage flow path 67. An upstream end of the fourth flow path portion 84 is connected with the second linkage flow path 82 on the downstream side of the upstream end of the first flow path portion 71 in the second linkage flow path 82.

The exhaust gas flow paths 65C further include a fifth flow path portion 85 that is located on the upstream side of the second linkage flow path 82. A downstream end of the fifth flow path portion 85 is connected with the second linkage flow path 82. The exhaust gas flow paths 65C also include a plurality of parallel flow path portions 86 on the −Y direction side of the fifth flow path portion 85. Downstream ends of the respective flow path portions 86 are connected with the second linkage flow path 82, and upstream ends are connected with the power generation portion 25. In the description below, the upstream side flow path portions 74 connected with the first linkage flow path 67 are also called "first upstream side flow path portions 74", and the plurality of parallel flow path portions 86 connected with the second linkage flow path 82 are also called "second upstream side flow path portions 86".

The downstream end of the fifth flow path portion 85 is located on the most upstream side in the second linkage flow path 82. No flow path having its upstream end connected with the power generation portion 25 is connected in a region of the second linkage flow path 82 on the direction side from the fourth flow path portion 84 toward the first flow path portion 71 in the array direction of the first flow path portion 71 and the fourth flow path portion 84, relative to the downstream end of the fifth flow path portion 85. In other words, no flow path having its upstream end connected with the power generation portion 25 is connected in a region on the +Y direction side of the downstream end of the fifth flow path portion 85 in the second linkage flow path 82. The fifth flow path portion 85 is located on the outermost side in the array direction of parallel flow paths 66 that are arranged to connect the power generation portion 25 with the second linkage flow path 82. The downstream end of the fifth flow path portion 85 is located on the direction side from the first flow path portion 71 toward the fourth flow path portion 84 in the array direction of the first flow path portion 71 and the fourth flow path portion 84, relative to the upstream end of the first flow path portion 71, when being viewed in a center axis direction parallel to a center axis CXe at the downstream end of the fifth flow path portion 85.

An extended region 87 by extending the downstream end of the fifth flow path portion 85 into the second linkage flow path 82 is extended in the second linkage flow path 82 not toward the upstream end of the first flow path portion 71 but toward the upstream end of the fourth flow path portion 84. The extended region 87 is extended toward a region without the upstream end of the first flow path portion 71 but with the fourth flow path portion 84 when being viewed from the upstream end of the first flow path portion 71. In the description below, the extended region 77 of the downstream end of the first flow path portion 71 in the first linkage flow path 67 described in the first embodiment is called "first extended region 77", and the extended region 87 of the downstream end of the fifth flow path portion 85 in the second linkage flow path 82 is called "second extended region 87". The second extended region 87 is a region defined by a tangent line C3 of a +Y direction side wall surface and a tangent line C4 of a −Y direction side wall surface that form the downstream end of the fifth flow path portion 85.

The second extended region 87 is extended in a direction along an extension axis EXe by extending the center axis CXe at the downstream end of the fifth flow path portion 85 into the second linkage flow path 82. The extension axis EXe is extended in a direction obliquely intersecting with a center axis CXf at the upstream end of the first flow path portion 71 toward a region on the upstream end side of the fourth flow path portion 84 relative to the upstream end of the first flow path portion 71. No flow path having its upstream side connected with the power generation portion 25 is connected in a region on the +Y direction side of the second extended region 82 in the second linkage flow path 82 or more specifically in a region on the direction side from the fourth flow path portion 84 toward the first flow path portion 71 in the second linkage flow path 82.

An end 87e in the extending direction of the second extended region 87 is located on the upstream end side of the fourth flow path portion 84, i.e., on the −Y direction side, relative to the upstream end of the first flow path portion 71, in the second linkage flow path 82. The upstream end of the first flow path portion 71 does not have any portion overlapping with the end 87e of the extended region 87. According to the third embodiment, the upstream end of the fourth flow path portion 84 has a portion overlapping with the end 87e of the second extended region 87. According to another embodiment, the upstream end of the fourth flow path portion 84 may be located on the −Y direction side of the end 87e of the second extended region 87 such as not to have any portion overlapping with the end 87e of the second extended region 87.

The exhaust gas flow paths 65C include an intersecting wall surface portion 89 that is extended from the upstream end of the first flow path portion 71 in a direction intersecting with the center axis CXf at the upstream end of the first flow path portion 71. The intersecting wall surface portion 89 is located on the direction side from the first flow path portion 71 toward the fourth flow path portion 84 in the array direction of the first flow path portion 71 and the fourth flow path portion 84, relative to the upstream end of the first flow path portion 71. The intersecting wall surface portion 89 forms part of the wall surface of the second linkage flow path 82 and is located between the upstream end of the first flow path portion 71 and the upstream end of the fourth flow path portion 84. In the description below, the intersecting wall surface portion 79 in the first linkage flow path 67 described in the first embodiment is called "first intersecting wall surface portion 79", and the intersecting wall surface portion 89 in the second linkage flow path 82 is called "second intersecting wall surface portion 89".

The second intersecting wall surface portion 89 is extended from the upstream end of the first flow path portion 71 in such a direction that intersects with a direction perpendicular to the center axis CXe at the downstream end of the fifth flow path portion 85 and that is away from the downstream end of the fifth flow path portion 85. The second intersecting wall surface portion 89 intersects with the center axis CXe at the downstream end of the fifth flow path portion 85 such as to be inclined in the direction from the first flow path portion 71 toward the fourth flow path portion 84. The second intersecting wall surface portion 89 intersects with and is inclined to the center axis CXe at the downstream end of the fifth flow path portion 85, such that the fourth flow path portion 84-side angle is larger than the first flow path portion 71-side angle in an angle between the second intersecting wall surface portion 89 and the center axis CXe at the downstream end of the fifth flow path portion 85. The downstream end of the fifth flow path portion 85 is opposed to the second intersecting wall surface portion 89 and to the upstream end of the fourth flow path portion 84 in the center axis direction parallel to the center axis CXe.

In the exhaust gas flow paths 65C, the moving path of a liquid component of the exhaust gas flowing from the fifth flow path portion 85 into the second linkage flow path 82 is similar to the moving path of the liquid component LQ of the exhaust gas flowing from the first flow path portion 71 into the first linkage flow path 67 described above with reference to FIG. 4B. In the exhaust gas flow paths 65C, the liquid component of the exhaust gas flowing from the fifth flow path portion 85 into the second linkage flow path 82 moves along the second extended region 87 and is subsequently introduced in the −Y direction along the second intersecting wall surface portion 89. This configuration suppresses the liquid component of the exhaust gas from flowing into the first flow path portion 71. Even when the liquid component of the exhaust gas flows into the first flow path portion 71, the configuration of the exhaust gas flow paths 65C suppresses the liquid component from flowing through the first linkage flow path 67 into the second flow path portion 72. Accordingly, the configuration of the exhaust gas flow paths 65C reduces the amount of water that reaches and flows into the second flow path portion 72 at the two stages, i.e., by means of the second linkage flow path 82 and the first linkage flow path 67. This configuration thus more effectively suppresses the exhaust gas flow paths 65C from being blocked by the remaining water.

In the exhaust gas flow paths 65C, a downstream side portion 71d of the first flow path portion 71 is curved in the −Y direction from the second flow path portion 72 toward the third flow path portion 73 to be connected with the first linkage flow path 67. Similarly, a downstream side portion 85d of the fifth flow path portion 85 is curved in the −Y direction from the first flow path portion 71 toward the fourth flow path portion 84 to be connected with the second linkage flow path 82.

Such curvature of the downstream side portion 71d of the first flow path portion 71 enables the upstream side portion of the first flow path portion 71 to be located on the −Y direction side, compared with a configuration without curvature of the downstream side portion 71d. The same applies to the downstream side portion 85d of the fifth flow path portion 85. Accordingly, this configuration suppresses expansion of the width in the Y-axis direction of the range where the exhaust gas flow paths 65C are formed.

According to the third embodiment, a downstream side portion of the fourth flow path portion 84 that is adjacent to the first flow path portion 71 is curved similarly to the downstream side portion 71d of the first flow path portion 71, in order not to interfere with the downstream side portion 71d of the first flow path portion 71. A downstream side portion of the second upstream side flow path portion 86 that is adjacent to the fifth flow path portion 85 is curved similarly to the downstream side portion 85d of the fifth flow path portion 85, in order not to interfere with the downstream side portion 85d of the fifth flow path portion 85. This configuration narrows the interval between the first flow path portion 71 and the fourth flow path portion 84 and the interval between the fifth flow path portion 85 and the adjacent second upstream side flow path portion 86 and thereby further reduces the width in the Y-axis direction of the range where the exhaust gas flow paths 65C are formed.

As described above, the configuration of the fuel cell including the exhaust gas flow paths 65C and the fuel cell stack according to the third embodiment further effectively suppresses the liquid component of the exhaust gas from entering the second flow path portion 72. Curvature of the downstream side portion 71d of the first flow path portion 71 and of the downstream side portion 85d of the fifth flow path portion 85 suppresses expansion of the range where the exhaust gas flow paths 65C are formed. Additionally, the fuel cell and the fuel cell stack of the third embodiment have various functions and advantageous effects similar to those described in the first embodiment and the second embodiment, in addition to the various functions and advantageous effects explained above in the description of the third embodiment.

4. Fourth Embodiment

Figure 8:
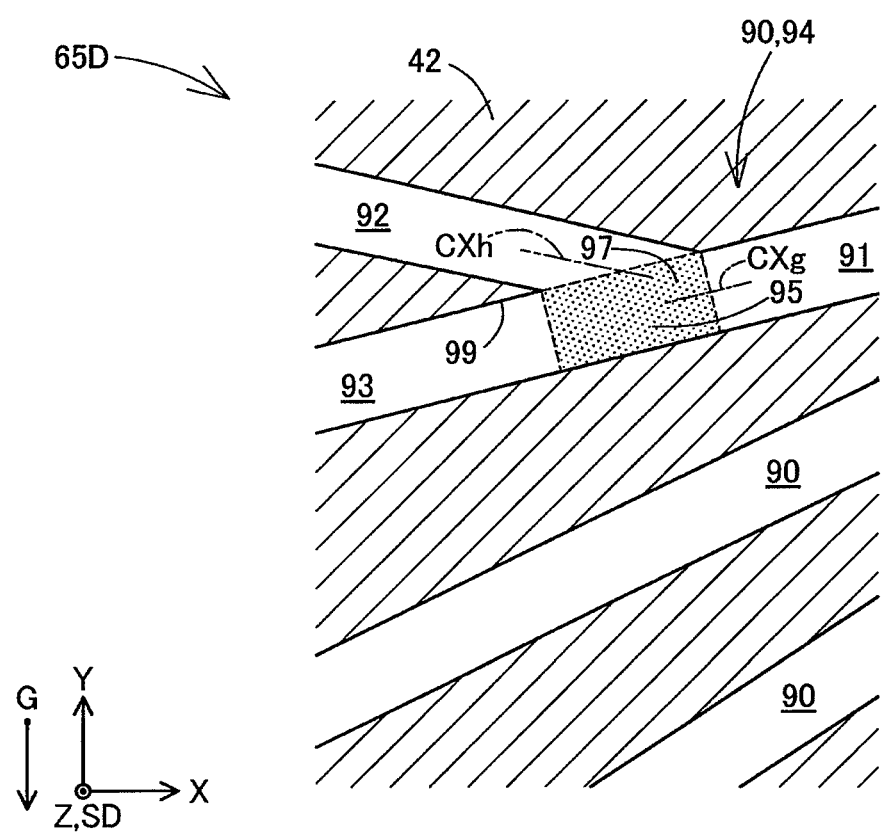
FIG. 8 is a schematic plan view illustrating the configuration of an exhaust gas flow path according to a fourth embodiment.

FIG. 8 is a schematic plan view illustrating exhaust gas flow paths 65D according to a fourth embodiment when being viewed along the stacking direction SD. Like FIG. 4A, internal spaces of the anode-side exhaust gas flow paths 65D are shown by open spaces, and parts of a separator 42 forming wall portions of the exhaust gas flow paths 65D are shown by hatched areas in FIG. 8. The configuration of the fuel cell and a fuel cell stack according to the fourth embodiment is substantially similar to the configuration of the fuel cell 10 and the fuel cell stack 100 according to the first embodiment, except the exhaust gas flow paths 65D of the fourth embodiment. The configuration of the exhaust gas flow paths 65D is common to the anode side and the cathode side in the fuel cell and the fuel cell stack according to the fourth embodiment, like the first embodiment. The following description on the configuration of the exhaust gas flow paths 65D is based on the view in a direction that the pair of separators 41 and 42 are opposed to each other across the resin frame 30, unless otherwise specified.

The exhaust gas flow paths 65D include a plurality of parallel flow paths 90 that are extended in parallel from the power generation portion 25 toward the manifold portions 52 and 54. An upstream end of each of the parallel flow paths 90 is connected with the power generation portion 25, and a downstream end is connected with the manifold portion 52 or 54. The plurality of parallel flow paths 90 include a branch flow path 94. The branch flow path 94 includes a first flow path portion 91 on the upstream side and a second flow path portion 92 and a third flow path portion 93 on the downstream side that are branched off from the first flow path portion 91. In the branch flow path 94, the first flow path portion 91 and the third flow path portion 93 are linearly aligned, and the second flow path portion 92 is connected such as to obliquely intersect with the first flow path portion 91 and the third flow path portion 93.

The first flow path portion 91 is extended from the power generation element 25 toward the manifold portion 52 or 54 and has a downstream end that is connected with a linkage part 95. Upstream ends of the second flow path portion 92 and the third flow path portion 93 are connected with the linkage part 95. The second flow path portion 92 and the third flow path portion 93 are extended in parallel to each other from the linkage part 95 and have downstream ends that are individually connected with the manifold portion 52 or 54. Downstream side portions of the second flow path portion 92 and the third flow path portion 93 are configured as resin frame-side flow path portions 69 described in the first embodiment, although not being specifically illustrated.

In the branch flow path 94, the linkage part 95 is a region facing the upstream end of the second flow path portion 92. The first flow path portion 91 is a flow path on the upstream side of the upstream end of the second flow path portion 92. The third flow path portion 93 is a flow path on the downstream side of the upstream end of the second flow path portion 92. The downstream end of the first flow path portion 91 is located on the most upstream side in the linkage part 95. The upstream end of the second flow path portion 92 is connected with the linkage part 95 on the upstream end side of the linkage part 95 relative to the upstream end of the third flow path portion 93.

The upstream end of the second flow path portion 92 is located on the +Y direction side of an extended region 97 by extending the downstream end of the first flow path portion 91 connected with the linkage part 95 into the linkage part 95. The extended region 97 of the first flow path portion 91 is extended not toward the upstream end of the second flow path portion 92 but toward the upstream end of the third flow path portion 93. The extended region 97 is extended toward a region without the upstream end of the second flow path portion 92 but with the upstream end of the third flow path portion 93 when being viewed from the upstream end of the second flow path portion 92. No flow path extended from the power generation portion 25 is connected in a region on the +Y direction side of the extended region 97 in the linkage part 95, i.e., in a region on the direction side from the third flow path portion 93 toward the second flow path portion 92.

When being viewed in the stacking direction SD, the downstream end of the first flow path portion 91 is opposed to the upstream end of the third flow path portion 93 across the linkage part 95 in a center axis direction parallel to a center axis CXg at the downstream end of the first flow path portion 91. The branch flow path 94 includes an intersecting wall surface portion 99 that is extended from the upstream end of the second flow path portion 92 in a direction intersecting with a center axis CXh at the upstream end of the second flow path portion 92. The intersecting wall surface portion 99 is located on the direction side from the second flow path portion 92 toward the third flow path portion 93 relative to the upstream end of the second flow path portion 92.

When being viewed in the stacking direction SD, the intersecting wall surface portion 99 is extended from the upstream end of the second flow path portion 92 in such a direction that intersects with a direction perpendicular to the center axis CXg at the downstream end of the first flow path portion 91 and that is away from the downstream end of the first flow path portion 91. The intersecting wall surface portion 99 forms part of the wall surface of the third flow path portion 93 and is extended along the center axis of the third flow path portion 93. The intersecting wall surface portion 99 is not opposed to the downstream end of the first flow path portion 91 in the center axis direction parallel to the center axis CXg.

The branch flow path 94 in the exhaust gas flow paths 65D causes the gas component having the small momentum in the exhaust gas flowing through the first flow path portion 91 to be branched and flowed into the second flow path portion 92 and the third flow path portion 93. Most part of the liquid component having the large momentum, on the other hand, flows along the extended region 97 in the linkage part 95 into the third flow path portion 93 and is introduced toward the downstream side of the third flow path portion 93 by the intersecting wall surface portion 99. The branch flow path 94 in the exhaust gas flow paths 65D thereby suppresses the liquid component of the exhaust gas from entering the second flow path portion 92. This configuration suppresses water from remaining at least in the second flow path portion 92 after stop of power generation of the fuel cell and the fuel cell stack. This configuration accordingly suppresses all the exhaust gas flow paths 65D from being blocked by the remaining water. Additionally, the fuel cell and the fuel cell stack of the fourth embodiment have various functions and advantageous effects similar to those described in the other respective embodiments, in addition to the various functions and advantageous effects explained above in the description of the fourth embodiment.

5. Other Embodiments

Any of the various configurations described in the above respective embodiments may be modified, for example, as described below. All the other embodiments described below should also be regarded as examples of the aspects implementing the technical features of the present disclosure.

*First Other Embodiments

Figure 9A:
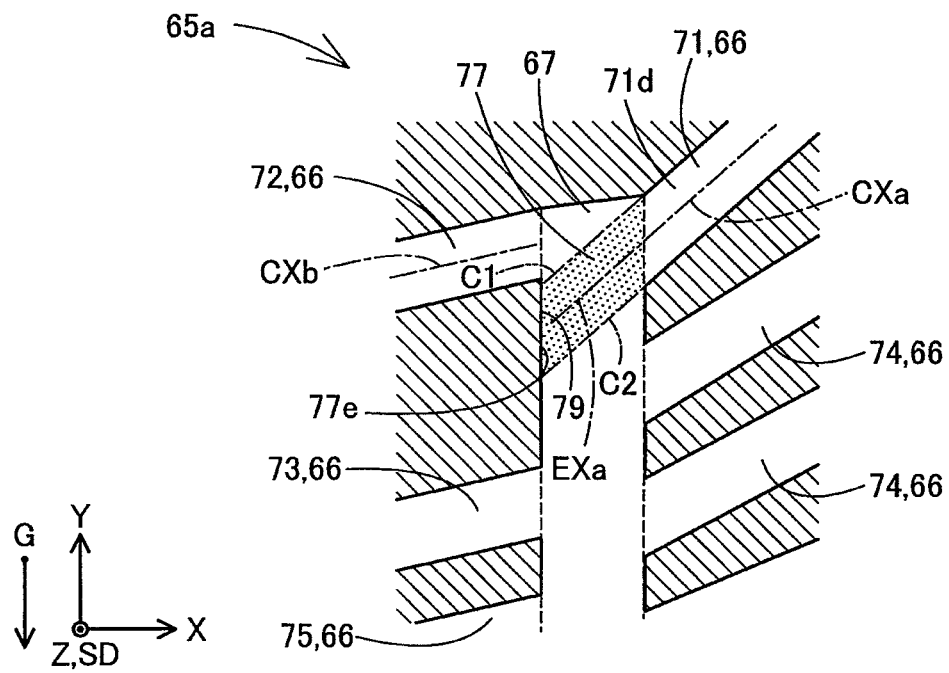
FIG. 9A is a first schematic plan view illustrating another configuration example of the exhaust gas flow path.
Figure 9B:
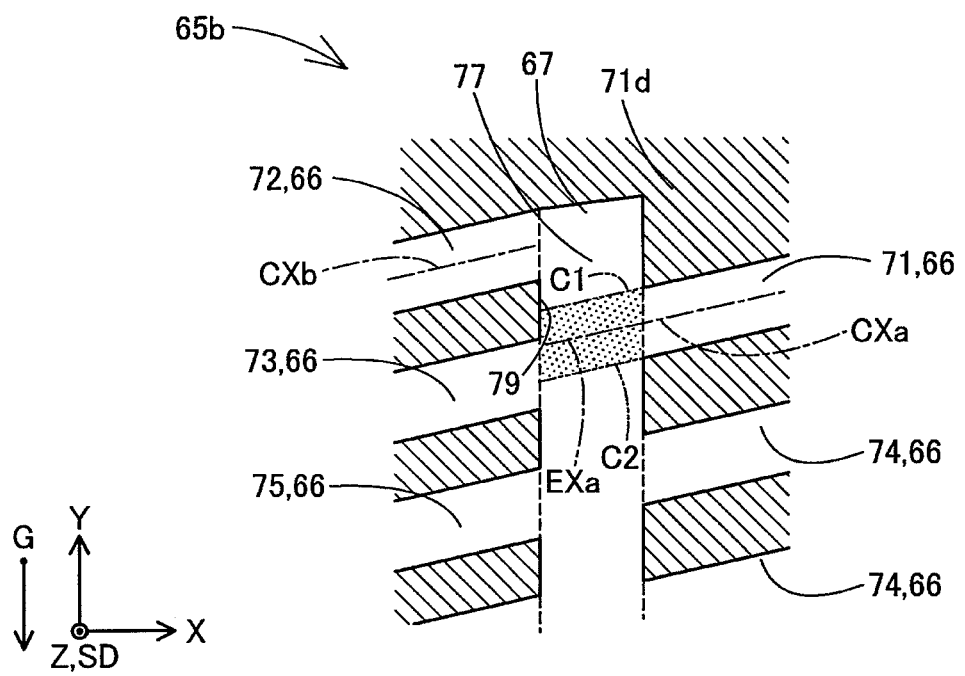
FIG. 9B is a second schematic plan view illustrating another configuration example of the exhaust gas flow path.
Figure 9C:
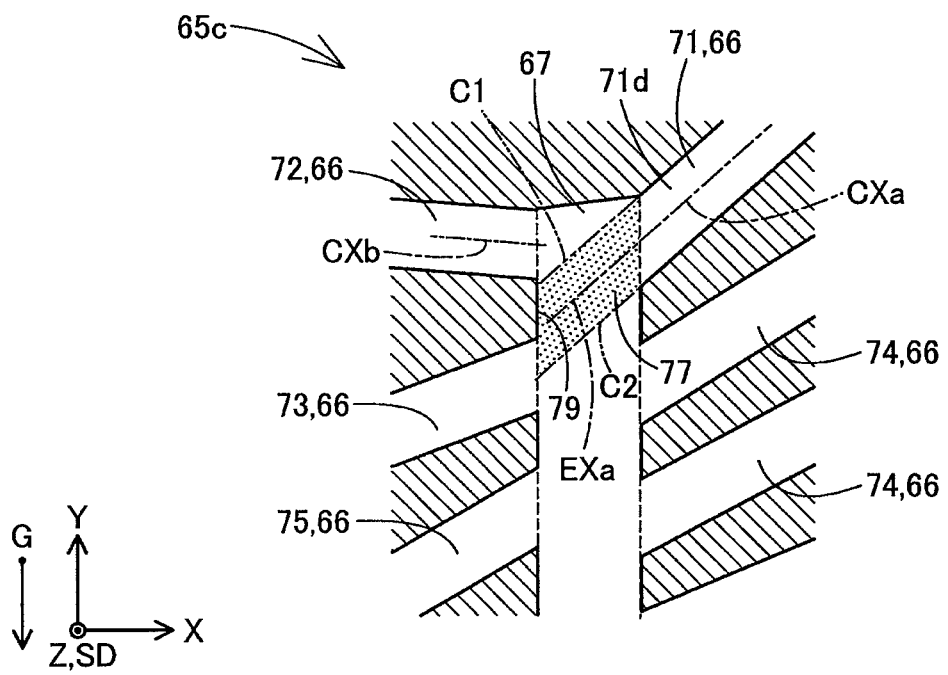
FIG. 9C is a third schematic plan view illustrating another configuration example of the exhaust gas flow path.

Other configuration examples of the exhaust gas flow paths 65 of the first embodiment are described below with reference to FIGS. 9A to 9C. Like exhaust gas flow paths 65a shown in FIG. 9A, the downstream end of the first flow path portion 71 may not be opposed to the upstream end of the third flow path portion 73 but may be opposed to only the intersecting wall surface portion 79. Like exhaust gas flow paths 65b shown in FIG. 9B, the first flow path portion 71 may be extended at an angle approximately parallel to the second flow path portion 72 and the third flow path portion 73. In other words, the first flow path portion 71 may be extended toward approximately same direction with the second flow path portion 72 and the third flow path portion 73. The requirements are that a vector parallel to the direction in which the extended region 77 of the downstream end of the first flow path portion 71 is extended has a direction component from the upstream end of the second flow path portion 72 toward the upstream end of the third flow path portion 73 and that the extended region 77 is located on the upstream end side of the third flow path portion 73 relative to the upstream end of the second flow path portion 72. Like exhaust gas flow paths 65c shown in FIG. 9C, the second flow path portion 72 and the third flow path portion 73 may be extended in directions intersecting with each other.

*Second Other Embodiments

In the exhaust gas flow paths 65, 65B, 65C, 65a to 65c of the respective embodiments described above, the flow path portions 74 and 75 other than the first flow path portion 71, the second flow path portion 72 and the third flow path portion 73 connected with the linkage flow path 67 may be omitted. In the exhaust gas flow paths 65, 65B and 65C, other flow paths that are not connected with the linkage flow path 67 but are arranged to connect the power generation portion 25 with the manifold portion 52 or 54 may be provided on the +Y direction side of the linkage flow path 67. In the exhaust gas flow paths 65D of the fourth embodiment, the parallel flow paths 90 other than the branch flow path 94 may be omitted. Other parallel flow paths 90 may be provided on the +Y direction side of the branch flow path 94.

*Third Other Embodiments

In the configurations of the respective embodiments including the other embodiments described above, any of the first flow path portion 71 or 91, the second flow path portion 72 or 92, the third flow path portion 73 or 93, the linkage flow path 67 and the linkage part 95 may be configured as the resin frame-side flow path portion 69. In the exhaust gas flow paths 65C of the third embodiment, the second linkage flow path 82 and the flow paths on the downstream side of the second linkage flow path 82 may be configured as the resin frame-side flow path portions 69. In the exhaust gas flow paths 65C of the third embodiment, the first flow path portion 71, the second flow path portion 72, the third flow path portion 73, the first linkage flow path 67, the fourth flow path portion 84, the fifth flow path portion 85 and the second linkage flow path 82 may be configured as the resin frame-side flow path portions 69. In the exhaust gas flow paths 65D of the fourth embodiment, the first flow path portion 71 may be configured as the separator-side flow path portion 68, and the second flow path portion 92 and the third flow path portion 93 may be configured as the resin frame-side flow path portions 69. The linkage part 95 may be configured by the space formed by the separator-side recess 47 and the frame-side recess 37 opposed to each other.

*Fourth Other Embodiments

The arrangement position of the fuel cell 10 during power generation is not limited to the position where the second flow path portion 72 or 92 is located on the upper side in the direction of gravity and the third flow path portion 73 or 93 is located on the lower side in the direction of gravity described in the above respective embodiments. The fuel cell 10 may be arranged, for example, such that the stacking direction SD is along the direction of gravity during power generation.

*Fifth Other Embodiments

The flow path configuration of any of the exhaust gas flow paths 65, 65B to 65D of the respective embodiments described above may not be necessarily applied to both the anode side and the cathode side but may be applied to only one of the anode side and the cathode side. It is preferable that the flow path configuration of any of the exhaust gas flow paths 65, 65B to 65D of the respective embodiments is applied to at least the anode side.

6. Other Aspects

The present disclosure is not limited to any of the embodiments described above but may be implemented by a diversity of other configurations without departing from the scope of the disclosure. For example, the technical features of any of the above embodiments and other embodiments may be replaced or combined appropriately, in order to solve part or all of the problems described above or in order to achieve part or all of the advantageous effects described above. Any of the technical features may be omitted appropriately unless the technical feature is described as essential herein. The technical features of the present disclosure may be implemented by the following aspects.

According to a first aspect of the present disclosure, there is provided a fuel cell. The fuel cell of this aspect comprises a membrane electrode assembly; a resin frame placed around a power generation portion of the membrane electrode assembly; a pair of separators arranged across the membrane electrode assembly and the resin frame placed therebetween; a manifold portion provided in periphery of the power generation portion and configured to cause an exhaust gas discharged from the power generation portion to be flowed out from the fuel cell; and an exhaust gas flow path configured by at least one of the pair of separators and the resin frame to introduce the exhaust gas from the power generation portion to the manifold portion. The exhaust gas flow path comprises a first flow path portion that is extended from the power generation portion in a direction toward the manifold portion; a second flow path portion and a third flow path portion that are extended parallel to each other on a downstream side of the first flow path portion and that have downstream ends respectively connected with the manifold portion; and a linkage part that is connected with a downstream end of the first flow path portion, an upstream end of the second flow path portion and an upstream end of the third flow path portion. When being viewed in a direction that the pair of separators are opposed to each other across the resin frame, the first flow path portion is connected with the linkage part, such that an extended region by extending the downstream end of the first flow path portion into the linkage part is extended not toward the upstream end of the second flow path portion but toward the upstream end of the third flow path portion in the linkage part. No flow path extended from the power generation portion is connected in a region of the linkage part on a direction side from the second flow path portion toward the third flow path portion in an array direction of the second flow path portion and the third flow path portion relative to the extended region.

The configuration of the fuel cell of this aspect causes a gas component of the exhaust gas flowing from the first flow path portion into the linkage part to be flowed into both the second flow path portion and the third flow path portion, while causing a liquid component of the exhaust gas to be introduced not toward the second flow path portion but toward the third flow path portion. This configuration suppresses the liquid component from flowing into the second flow path portion and thereby suppresses water from remaining in the second flow path portion after stop of power generation of the fuel cell. This accordingly suppresses all the exhaust gas flow paths in the fuel cell from being blocked by frozen remaining water in a low temperature environment and reduces difficulty in a restart of power generation.

In the fuel cell of the above aspect, the linkage part may be a linkage flow path that is extended to intersect with the second flow path portion and the third flow path portion. When being viewed along the direction that the par of separators are opposed to each other across the resin frame, a downstream side portion of the first flow portion may be connected with the linkage flow path to be inclined in a direction from the second flow path portion toward the third flow path portion. An end in an extending direction of the extended region may be located on the direction side from the second flow path portion toward the third flow path portion relative to the upstream end of the second flow path portion.

The configuration of the fuel cell of this aspect causes the liquid component of the exhaust gas to be introduced along the flow path direction of the linkage flow path from the upstream end side of the second flow path portion to the upstream end side of the third flow path portion. This further suppresses the liquid component from flowing into the second flow path portion.

According to a second aspect of the present disclosure, there is provided a fuel cell. The fuel cell of this aspect comprises a membrane electrode assembly; a resin frame placed around a power generation portion of the membrane electrode assembly; a pair of separators arranged across the membrane electrode assembly and the resin frame placed therebetween; a manifold portion provided in periphery of the power generation portion and configured to cause an exhaust gas discharged from the power generation portion to be flowed out from the fuel cell; and an exhaust gas flow path configured by at least one of the pair of separators and the resin frame to introduce the exhaust gas from the power generation portion to the manifold portion. The exhaust gas flow path comprises a first flow path portion that is extended from the power generation portion in a direction toward the manifold portion; a second flow path portion and a third flow path portion that are extended parallel to each other on a downstream side of the first flow path portion and that have downstream ends respectively connected with the manifold portion; a linkage part that is connected with a downstream end of the first flow path portion, an upstream end of the second flow path portion and an upstream end of the third flow path portion; and an intersecting wall surface portion that is located on a direction side from the second flow path portion toward the third flow path portion relative to the upstream end of the second flow path portion and that is extended from the upstream end of the second flow path portion in a direction intersecting with a center axis at the upstream end of the second flow path portion. The downstream end of the first flow path portion is located on a most upstream side in the linkage part. When being viewed in a center axis direction of the downstream end of the first flow path portion, the downstream end of the first flow path portion is located on the direction side from the second flow path portion toward the third flow path portion relative to the upstream end of the second flow path portion. When being viewed in a direction that the pair of separators are opposed to each other across the resin frame, the downstream end of the first flow path is opposed to at least one of the intersecting wall surface portion and the upstream end of the third flow path portion in the center axis direction of the downstream end of the first flow path portion. The intersecting wall surface portion is extended from the upstream end of the second flow path portion in a direction that intersects with a direction perpendicular to a center axis at the downstream end of the first flow path portion and that is away from the downstream end of the first flow path portion.

The configuration of the fuel cell of this aspect causes the gas component of the exhaust gas flowing from the first flow path portion into the linkage part to be flowed into both the second flow path portion and the third flow path portion, while causing the liquid component of the exhaust gas to be introduced not toward the second flow path portion but toward the third flow path portion. This configuration suppresses the liquid component from flowing into the second flow path portion and thereby suppresses water from remaining in the second flow path portion after stop of power generation of the fuel cell. This accordingly suppresses all the exhaust gas flow paths in the fuel cell from being blocked by frozen remaining water in a low temperature environment and reduces difficulty in a restart of power generation.

In the fuel cell of the above aspect, the linkage part may be a linkage flow path that is extended in a direction intersecting with the second flow path portion and the third flow path portion. The intersecting wall surface portion may form part of a wall surface of the linkage flow path. When being viewed in the direction that the pair of separators are opposed to each other across the resin frame, a downstream side portion of the first flow path portion may be connected with the linkage flow path to be inclined to the intersecting wall surface portion in a direction from the second flow path portion toward the third flow path portion.

In the fuel cell of this aspect, the linkage flow path having the intersecting wall surface portion causes the liquid component of the exhaust gas flowing out from the first flow path portion to be introduced from the second flow path portion side toward the third flow path portion side. This configuration further suppresses the liquid component from flowing into the second flow path portion.

In the fuel cell of the above aspect, the linkage flow path may be a first linkage flow path, and the extended region may be a first extended region. The exhaust gas flow path may further comprise a fourth flow path portion that is extended parallel to the first flow path portion and that has a downstream end connected with the first linkage flow path; a second linkage flow path that is connected with an upstream end of the first flow path portion and with an upstream end of the fourth flow path portion; and a fifth flow path portion that is located on an upstream side of the second linkage flow path and that has a downstream end connected with the second linkage flow path. When being viewed in the direction that the pair of separators are opposed to each other across the resin frame, the fifth flow path portion may be connected with the second linkage flow path, such that a second extended region by extending the downstream end of the fifth flow path portion into the second linkage flow path is extended not toward the upstream end of the first flow path portion but toward the upstream end of the fourth flow path portion in the second linkage flow path. No flow path having an upstream end connected with the power generation portion may be connected in a region of the second linkage flow path on a direction side from the fourth flow path portion toward the first flow path portion in an array direction of the first flow path portion and the fourth flow path portion, relative to the second extended region.

The configuration of the fuel cell of this aspect can reduce the amount of water flowing into the second flow path portion at two stages, i.e., by the first linkage flow path and the second linkage flow path.

In the fuel cell of the above aspect, the linkage flow path may be a first linkage flow path, and the intersecting wall surface portion may be a first intersecting wall surface portion. The exhaust gas flow path may further comprise a fourth flow path portion that is extended parallel to the first flow path portion and that has a downstream end connected with the first linkage flow path; a second linkage flow path that is connected with an upstream end of the first flow path portion and with an upstream end of the fourth flow path portion; a fifth flow path portion that is located on an upstream side of the second linkage flow path and that has a downstream end connected with the second linkage flow path; and a second intersecting wall surface portion that is located on a direction side from the first flow path portion toward the fourth flow path portion relative to the upstream end of the first flow path portion and that is extended in a direction intersecting with a center axis at the upstream end of the first flow path portion. The downstream end of the fifth flow path portion may be located on a most upstream side in the second linkage flow path. When being viewed in a center axis direction of the downstream end of the fifth flow path portion, the downstream end of the fifth flow path portion may be located on the direction side from the first flow path portion toward the fourth flow path portion relative to the upstream end of the first flow path portion. When being viewed in the direction that the pair of separators are opposed to each other across the resin frame, the downstream end of the fifth flow path portion may be opposed to at least one of the second intersecting wall surface portion and an upstream end of the fourth flow path portion in a center axis direction of the downstream end of the fifth flow path portion. The second intersecting wall surface portion may be extended from the upstream end of the first flow path portion in a direction that intersects with a direction perpendicular to a center axis at the downstream end of the fifth flow path portion and that is away from the downstream end of the fifth flow path portion.

The configuration of the fuel cell of this aspect can reduce the amount of water flowing into the second flow path portion at two stages, i.e., by the first linkage flow path and the second linkage flow path.

In the fuel cell of the above aspect, the first flow path portion may be curved in a direction from the second flow path portion toward the third flow path portion to be connected with the first linkage flow path, and the fifth flow path portion may be curved in a direction from the first flow path portion toward the fourth flow path portion to be connected with the second linkage flow path.

The configuration of the fuel cell of this aspect suppresses the range of formation of the exhaust gas flow path from being expanded by extending an upstream side portion of the first flow path portion in a direction from the third flow path portion toward the second flow path portion and extending an upstream side portion of the fifth flow path portion in a direction from the fourth flow path portion toward the first flow path portion.

In the fuel cell of the above aspect, when being viewed in the direction that the pair of separators are opposed to each other across the resin frame, a third flow path portion-side angle θb between a center axis of the linkage flow path and a center axis at the upstream end of the second flow path portion may be larger than a second flow path portion-side angle θa between the center axis of the linkage flow path and a center axis at the downstream end of the first flow path portion.

The configuration of the fuel cell of this aspect causes the liquid component of the exhaust gas to be flowed into the linkage flow path at such an angle that makes the liquid component difficult to flow into the second flow path portion but that causes the liquid component to flow toward the third flow path portion. This configuration further suppresses the liquid component of the exhaust gas from flowing into the second flow path portion.

In the fuel cell of the above aspect, the first flow path portion may be configured by a space between the resin frame and a separator-side recess provided in a resin frame-side surface of one separator out of the pair of separators. Each of the second flow path portion and the third flow path portion may be configured by a space between the one separator and a frame-side recess provided in one separator-side surface of the resin frame. The linkage part may be configured by a space formed by the separator-side recess and the frame-side recess opposed to each other.

In the fuel cell of this aspect, the downstream end that is an outlet of the first flow path portion and the upstream end that is an inlet of the second flow path portion are open in the linkage part at positions deviated from each other in a stacking direction of the resin frame and the separators. This configuration more effectively suppresses the liquid component included in the exhaust gas flowing from the first flow path portion into the linkage portion, from flowing into the second flow path portion.

The fuel cell of the above aspect may be arranged, such that the second flow path portion is located on an upper side in a direction of gravity and that the third flow path portion is located on a lower side in the direction of gravity.

The configuration of the fuel cell of this aspect causes the liquid component of the exhaust gas to be more readily introduced not toward the upstream end of the second flow path portion but toward the upstream end of the third flow path portion in the linkage part by applying the function of the gravity. This more effectively suppresses the liquid component of the exhaust gas from flowing into the second flow path portion.

According to a third aspect of the present disclosure, there is provided a fuel cell stack configured by stacking a plurality of the fuel cells according to any of the above aspects. The fuel cell stack of this aspect comprises a seal member that is provided between adjacent fuel cells to surround the manifold portion and to be placed between opposed separators of the adjacent fuel cells and that is configured to prevent leakage of a fluid from between the adjacent fuel cells. The second flow path portion and the third flow path portion are provided in the resin frame and are extended to intersect with the seal member when being viewed in a stacking direction of the fuel cells.

The fuel cell stack of this aspect suppresses at least the second flow path portion from being blocked by frozen water, even when the flow path diameter of the exhaust gas flow path formed in the resin frame is reduced by a pressing force which the resin frame receives from the seal member.

All the plurality of components included in each of the aspects of the disclosure described above are not essential, but some components among the plurality of components may be appropriately changed, omitted or replaced with other additional components or part of the limitations may be deleted, in order to solve part or all of the problems described above or in order to achieve part or all of the advantageous effects described herein. In order to solve part or all of the problems described above or in order to achieve part or all of the advantageous effects described herein, part or all of the technical features included in one aspect of the disclosure described above may be combined with part or all of the technical features included in another aspect of the disclosure described above to provide one independent aspect of the disclosure.

The technical features of the present disclosure may be implemented by various aspects other than the fuel cell and the fuel cell stack, for example, a fuel cell system including the fuel cell or the fuel cell stack, a vehicle with the fuel cell system mounted thereon, a flow path configuration of an exhaust gas flow path in the fuel cell, and a resin frame and a separator having recesses configured to form an exhaust gas flow path in the fuel cell.

What is claimed is:

1. A fuel cell, comprising:
a membrane electrode assembly;
a resin frame placed around a power generation portion of the membrane electrode assembly;
a pair of separators arranged across the membrane electrode assembly and the resin frame placed therebetween;
a manifold portion provided in periphery of the power generation portion and configured to cause an exhaust gas discharged from the power generation portion to be flowed out from the fuel cell; and
an exhaust gas flow path configured by at least one of the pair of separators and the resin frame to introduce the exhaust gas from the power generation portion to the manifold portion, wherein
the exhaust gas flow path comprises:
 a first flow path portion that is extended from the power generation portion in a direction toward the manifold portion;
 a second flow path portion and a third flow path portion that are extended parallel to each other on a downstream side of the first flow path portion and that have downstream ends respectively connected with the manifold portion; and
 a linkage part that is connected with a downstream end of the first flow path portion, an upstream end of the second flow path portion and an upstream end of the third flow path portion, wherein
when being viewed in a direction that the pair of separators are opposed to each other across the resin frame,
 the first flow path portion is connected with the linkage part, such that an extended region by extending the downstream end of the first flow path portion into the linkage part is extended not toward the upstream end of the second flow path portion but toward the upstream end of the third flow path portion in the linkage part, and
 no flow path extended from the power generation portion is connected in a region of the linkage part on a direction side from the second flow path portion toward the third flow path portion in an array direction of the second flow path portion and the third flow path portion relative to the extended region.

2. The fuel cell according to claim 1,
wherein the linkage part constitutes as a linkage flow path that is extended to intersect with the second flow path portion and the third flow path portion, and
when being viewed along the direction that the par of separators are opposed to each other across the resin frame,
a downstream side portion of the first flow portion is connected with the linkage flow path to be inclined in a direction from the second flow path portion toward the third flow path portion, and
an end in an extending direction of the extended region is located on the direction side from the second flow path portion toward the third flow path portion relative to the upstream end of the second flow path portion.

3. A fuel cell, comprising:
a membrane electrode assembly;
a resin frame placed around a power generation portion of the membrane electrode assembly;
a pair of separators arranged across the membrane electrode assembly and the resin frame placed therebetween;
a manifold portion provided in periphery of the power generation portion and configured to cause an exhaust gas discharged from the power generation portion to be flowed out from the fuel cell; and
an exhaust gas flow path configured by at least one of the pair of separators and the resin frame to introduce the exhaust gas from the power generation portion to the manifold portion, wherein
the exhaust gas flow path comprises:
 a first flow path portion that is extended from the power generation portion in a direction toward the manifold portion;
 a second flow path portion and a third flow path portion that are extended parallel to each other on a downstream side of the first flow path portion and that have downstream ends respectively connected with the manifold portion;
 a linkage part that is connected with a downstream end of the first flow path portion, an upstream end of the second flow path portion and an upstream end of the third flow path portion; and
 an intersecting wall surface portion that is located on a direction side from the second flow path portion toward the third flow path portion relative to the upstream end of the second flow path portion and that is extended from the upstream end of the second flow path portion in a direction intersecting with a center axis at the upstream end of the second flow path portion, wherein
the downstream end of the first flow path portion is located on a most upstream side in the linkage part,
when being viewed in a center axis direction of the downstream end of the first flow path portion, the downstream end of the first flow path portion is located on the direction side from the second flow path portion toward the third flow path portion relative to the upstream end of the second flow path portion, and
when being viewed in a direction that the pair of separators are opposed to each other across the resin frame,
 the downstream end of the first flow path is opposed to at least one of the intersecting wall surface portion and the upstream end of the third flow path portion in the center axis direction of the downstream end of the first flow path portion, and
 the intersecting wall surface portion is extended from the upstream end of the second flow path portion in a direction that intersects with a direction perpendicular to a center axis at the downstream end of the first flow path portion and that is away from the downstream end of the first flow path portion.

4. The fuel cell according to claim 3,
wherein the linkage part constitutes as a linkage flow path that is extended in a direction intersecting with the second flow path portion and the third flow path portion,
the intersecting wall surface portion forms part of a wall surface of the linkage flow path, and
when being viewed in the direction that the pair of separators are opposed to each other across the resin frame, a downstream side portion of the first flow path portion is connected with the linkage flow path to be inclined to the intersecting wall surface portion in a direction from the second flow path portion toward the third flow path portion.

5. The fuel cell according to claim 2,
wherein the linkage flow path is a first linkage flow path, and
the extended region is a first extended region, wherein
the exhaust gas flow path further comprises:
   a fourth flow path portion that is extended parallel to the first flow path portion and that has a downstream end connected with the first linkage flow path;
   a second linkage flow path that is connected with an upstream end of the first flow path portion and with an upstream end of the fourth flow path portion; and
   a fifth flow path portion that is located on an upstream side of the second linkage flow path and that has a downstream end connected with the second linkage flow path, wherein
when being viewed in the direction that the pair of separators are opposed to each other across the resin frame,
   the fifth flow path portion is connected with the second linkage flow path, such that a second extended region by extending the downstream end of the fifth flow path portion into the second linkage flow path is extended not toward the upstream end of the first flow path portion but toward the upstream end of the fourth flow path portion in the second linkage flow path, and
   no flow path having an upstream end connected with the power generation portion is connected in a region of the second linkage flow path on a direction side from the fourth flow path portion toward the first flow path portion in an array direction of the first flow path portion and the fourth flow path portion, relative to the second extended region.

6. The fuel cell according to claim 4,
wherein the linkage flow path is a first linkage flow path, and
the intersecting wall surface portion is a first intersecting wall surface portion, wherein
the exhaust gas flow path further comprises:
   a fourth flow path portion that is extended parallel to the first flow path portion and that has a downstream end connected with the first linkage flow path;
   a second linkage flow path that is connected with an upstream end of the first flow path portion and with an upstream end of the fourth flow path portion;
   a fifth flow path portion that is located on an upstream side of the second linkage flow, path and that has a downstream end connected with the second linkage flow path; and
   a second intersecting wall surface portion that is located on a direction side from the first flow path portion toward the fourth flow path portion relative to the upstream end of the first flow path portion and that is extended in a direction intersecting with a center axis at the upstream end of the first flow path portion, wherein
the downstream end of the fifth flow path portion is located on a most upstream side in the second linkage flow path,
when being viewed in a center axis direction of the downstream end of the fifth flow path portion, the downstream end of the fifth flow path portion is located on the direction side from the first flow path portion toward the fourth flow path portion relative to the upstream end of the first flow path portion, and
when being viewed in the direction that the pair of separators are opposed to each other across the resin frame,
   the downstream end of the fifth flow path portion is opposed to at least one of the second intersecting wall surface portion and an upstream end of the fourth flow path portion in a center axis direction of the downstream end of the fifth flow path portion, and
   the second intersecting wall surface portion is extended from the upstream end of the first flow path portion in a direction that intersects with a direction perpendicular to a center axis at the downstream end of the fifth flow path portion and that is away from the downstream end of the fifth flow path portion.

7. The fuel cell according to claim 5,
wherein the first flow path portion is curved in a direction from the second flow path portion toward the third flow path portion to be connected with the first linkage flow path, and
the fifth flow path portion is curved in a direction from the first flow path portion toward the fourth flow path portion to be connected with the second linkage flow path.

8. The fuel cell according to claim 6,
wherein the first flow path portion is curved in a direction from the second flow path portion toward the third flow path portion to be connected with the first linkage flow path, and
the fifth flow path portion is curved in a direction from the first flow path portion toward the fourth flow path portion to be connected with the second linkage flow path.

9. The fuel cell according to claim 2,
wherein when being viewed in the direction that the pair of separators are opposed to each other across the resin frame,
a third flow path portion-side angle θb between a center axis of the linkage flow path and a center axis at the upstream end of the second flow path portion is larger than a second flow path portion-side angle θa between the center axis of the linkage flow path and a center axis at the downstream end of the first flow path portion.

10. The fuel cell according to claim 4,
wherein when being viewed in the direction that the pair of separators are opposed to each other across the resin frame,
a third flow path portion-side angle θb between a center axis of the linkage flow path and a center axis at the upstream end of the second flow path portion is larger than a second flow path portion-side angle θa between the center axis of the linkage flow path and a center axis at the downstream end of the first flow path portion.

11. The fuel cell according to claim 1,
wherein the first flow path portion is configured by a space between the resin frame and a separator-side recess provided in a resin frame-side surface of one separator out of the pair of separators,
each of the second flow path portion and the third flow path portion is configured by a space between the one separator and a frame-side recess provided in one separator-side surface of the resin frame, and
the linkage part is configured by a space formed by the separator-side recess and the frame-side recess opposed to each other.

12. The fuel cell according to claim 3,
wherein the first flow path portion is configured by a space between the resin frame and a separator-side recess provided in a resin frame-side surface of one separator out of the pair of separators,
each of the second flow path portion and the third flow path portion is configured by a space between the one separator and a frame-side recess provided in one separator-side surface of the resin frame, and
the linkage part is configured by a space formed by the separator-side recess and the frame-side recess opposed to each other.

13. The fuel cell according to claim 1,
the fuel cell being arranged, such that the second flow path portion is located on an upper side in a direction of gravity and that the third flow path portion is located on a lower side in the direction of gravity.

14. The fuel cell according to claim 3,
the fuel cell being arranged, such that the second flow path portion is located on an upper side in a direction of gravity and that the third flow path portion is located on a lower side in the direction of gravity.

15. A fuel cell stack configured by stacking a plurality of the fuel cells according to claim 1,
the fuel cell stack comprising:
a seal member that is provided between adjacent fuel cells to surround the manifold portion and to be placed between opposed separators of the adjacent fuel cells and that is configured to prevent leakage of a fluid from between the adjacent fuel cells, wherein
the second flow path portion and the third flow path portion are provided in the resin frame and are extended to intersect with the seal member when being viewed in a stacking direction of the fuel cells.

16. A fuel cell stack configured by stacking a plurality of the fuel cells according to claim 3,
the fuel cell stack comprising:
a seal member that is provided between adjacent fuel cells to surround the manifold portion and to be placed between opposed separators of the adjacent fuel cells and that is configured to prevent leakage of a fluid from between the adjacent fuel cells, wherein
the second flow path portion and the third flow path portion are provided in the resin frame and are extended to intersect with the seal member when being viewed in a stacking direction of the fuel cells.

* * * * *